United States Patent
Zollinger et al.

(10) Patent No.: US 9,821,410 B2
(45) Date of Patent: Nov. 21, 2017

(54) TURBOCHARGER SHAFT AND WHEEL ASSEMBLY

(71) Applicant: Honeywell International Inc., Morristown, NJ (US)

(72) Inventors: Brent Zollinger, Bellflower, CA (US); Maurizio Barbone, Atessa (IT); Didier Horlaville, Laneuveville-devant-Nancy (FR); Andrei Minculescu, Bucharest (RO); Nicolas Vazeille, Bainville-aux-Miroirs (FR)

(73) Assignee: Honeywell International Inc., Morris Plains, NJ (US)

( * ) Notice: Subject to any disclaimer, the term of this patent is extended or adjusted under 35 U.S.C. 154(b) by 422 days.

(21) Appl. No.: 14/488,089

(22) Filed: Sep. 16, 2014

(65) Prior Publication Data
US 2016/0074963 A1 Mar. 17, 2016

(51) Int. Cl.
*B23K 26/20* (2014.01)
*B23K 26/08* (2014.01)
*B23K 26/03* (2006.01)
*B23K 26/067* (2006.01)
*F01D 5/02* (2006.01)
*F01D 25/28* (2006.01)

(52) U.S. Cl.
CPC ............ *B23K 26/20* (2013.01); *B23K 26/032* (2013.01); *B23K 26/067* (2013.01); *B23K 26/0823* (2013.01); *F01D 5/025* (2013.01); *F01D 25/285* (2013.01); *F05D 2220/40* (2013.01); *F05D 2230/234* (2013.01); *F05D 2260/80* (2013.01)

(58) Field of Classification Search
CPC .. B23K 26/20; B23K 26/0823; B23K 26/032; B23K 26/067; B23K 26/1458
USPC ............ 219/121.63, 121.64, 121.67, 121.69, 219/121.83
See application file for complete search history.

(56) References Cited

U.S. PATENT DOCUMENTS

| 4,983,064 | A | | 1/1991 | Kawaguchi et al. | |
|---|---|---|---|---|---|
| 5,248,078 | A | * | 9/1993 | Deal | B23K 20/129 228/113 |
| 5,319,178 | A | * | 6/1994 | Sando | G21C 3/10 219/125.11 |
| 5,499,755 | A | * | 3/1996 | Myers | B23K 11/002 219/159 |
| 5,651,903 | A | * | 7/1997 | Shirk | B23K 26/034 219/121.63 |
| 6,291,086 | B1 | | 9/2001 | Nguyen-Dinh | |
| 6,563,074 | B2 | | 5/2003 | Bazukuri et al. | |

(Continued)

FOREIGN PATENT DOCUMENTS

| CN | 101 480 760 A | | 7/2009 |
|---|---|---|---|
| CN | 101480760 A | * | 7/2009 |

(Continued)

OTHER PUBLICATIONS

EP Application No. 15 18 4969—European Search Report dated Feb. 1, 2016 (8 pages).

(Continued)

*Primary Examiner* — Thien S Tran
(74) *Attorney, Agent, or Firm* — Brian J. Pangrle

(57) ABSTRACT

A system can include a controller; a force applicator; a rotatable shaft centering collet; a drive mechanism that rotates the rotatable shaft centering collect; and a laser beam unit.

17 Claims, 22 Drawing Sheets

(56) References Cited

U.S. PATENT DOCUMENTS

| | | | |
|---|---|---|---|
| 6,848,180 | B2 | 2/2005 | Shimizu |
| 6,948,913 | B2 | 9/2005 | Heyes et al. |
| 7,156,282 | B1 | 1/2007 | Renaud et al. |
| 7,287,960 | B2 | 10/2007 | Decker |
| 2005/0109745 | A1* | 5/2005 | Wessner ............ B23K 26/0643 219/121.84 |
| 2005/0139640 | A1 | 6/2005 | Kay |
| 2006/0279731 | A1 | 12/2006 | Beyer |
| 2009/0050612 | A1* | 2/2009 | Serruys ............... B23K 26/032 219/121.83 |
| 2010/0003132 | A1 | 1/2010 | Holzschuh |
| 2010/0154214 | A1 | 6/2010 | Hsu et al. |
| 2011/0089148 | A1* | 4/2011 | Mootz ............... B23K 26/0838 219/121.63 |
| 2012/0076639 | A1 | 3/2012 | Vazeille et al. |
| 2012/0097645 | A1* | 4/2012 | Clark ................ B23K 15/0006 219/121.14 |
| 2012/0188365 | A1* | 7/2012 | Stork .................. B23K 26/046 348/90 |
| 2013/0272781 | A1* | 10/2013 | Oiwa ................ B23K 26/0823 403/271 |
| 2015/0078905 | A1* | 3/2015 | Albuzat .............. B23K 1/0018 416/213 R |

FOREIGN PATENT DOCUMENTS

| | | | |
|---|---|---|---|
| CN | 103 438 058 A | | 12/2013 |
| DE | 10 2007 059262 A1 | | 6/2009 |
| DE | 10 2008 046945 A1 | | 3/2010 |
| DE | 10 2012 201353 A1 | | 8/2013 |
| DE | 10 2012 205042 A1 | | 10/2013 |
| DE | WO 2013143944 A1 * | 10/2013 | ........... B23K 1/0018 |
| EP | 1134385 B1 | | 10/2006 |
| EP | 2065564 A2 | | 6/2009 |
| EP | 2 206 798 A1 | | 7/2010 |
| EP | 2 434 126 A2 | | 3/2012 |
| EP | 2065564 A3 | | 5/2012 |
| EP | 2 617 512 A1 | | 7/2013 |
| EP | 2617512 A1 | | 7/2013 |
| JP | 61152902 A | | 7/1986 |
| JP | 7286528 A | | 10/1995 |
| JP | 2007205253 A | | 8/2007 |
| JP | 2012 061496 A | | 3/2012 |
| WO | 2010/036425 A2 | | 4/2010 |

OTHER PUBLICATIONS

EP Application No. 15184376.9-1610 / 3006157, ESR and Exam Report dated Apr. 25, 2016 (11 pages).

EP Application No. 15184959.2-1607 / , ESR and Exam Report dated Feb. 10, 2016 (8 pages).

EP Application No. 15185375.1-1610/, ESR dated Feb. 10, 2016 (8 pages).

EP Application No. 15185294A-1610 / , ESR and Exam Report dated Feb. 11, 2016 (8 pages).

PRIMES, Power Measuring Module, Instructions, Revision May 2012 (36 pages).

Kuo et al, Effects of Different Shielding Gases and Power Waveforms on Penetration Characteristics and Porosity Formation in Laser Welding of Inconel 690 Alloy, Materials Transactions, vol. 48, No. 2 (2007) pp. 219-226 (8 pages).

Hussein et al., The role of laser wavelength on plasma generation and expansion of adiabatic plumes in air, Journal of Applied Physics, 113, 143305 (2013), pp. 143305-1 to 143305-10 (10 pages).

Joesph et al., Weld metal characterization of 316L(N) austenitic stainless steel by electron beam welding process, International Journal of Engineering, Science and Technology, vol. 4, No. 2, 2012, pp. 169-176 (8 pages).

Apostol et al., Input parameters influence on the residual stress and distortions at laser welding using finite element analysis, U.P.B. Sci. Bull., Series D, vol. 74, Iss. 2, 2012, pp. 153-164 (12 pages).

Haynes International, Fabrication of Hastelloy Corrosion-Resistant Alloys, 2003 (40 pages).

Rao et al., Study on effect of welding speed on micro structure and mechanical properties of pulsed current micro plasma arc welded Inconel 625 sheets, Journal of Minerals and Materials Characterization and Engineering, 2012, 11, 1027-1033, Oct. 2012 (7 pages).

Boc, Linde Group, Laser welding. Laserline Technical, 2009 (11 pages).

Glickstein et al., Technical Note: Effect of weld pool configuration on heat-affected zone shape, Welding Journal, Welding Research Supplement, pp. 110-s to 112-s, Jun. 1981 (3 pages).

Weeter et al., Development of a weldability test for pulsed laser beam welding, Welding Journal, Welding Research Supplement, pp. 51-s to 62-s, Mar. 1986 (12 pages).

Lugscheider et al. Thermal and Metallurgical Influences on AISI 216 and Inconel 625 by High Temperature Brazing with Nickel Base Filler Metals, Welding Journal, Welding Research Supplement, Oct. 1982, pp. 329-s to 333-s (5 pages).

EP Application No. 15185375.1-1610 / 2998505, Extended European Search Report dated Jun. 8, 2016 (10 pages).

* cited by examiner

Sensors and Sensor Information 1810

| Sensor | Wavelength | Information |
|---|---|---|
| Plasma (or metal plume) | UV, < ~ 600 nm | Power, Focus, Gas, Seam, Weld Gap, Etc. |
| Temperature | NIR, ~ 1100 - ~1800 nm | Δ Heat Dissipation, Porosity, Penetration, Etc. |
| Back Reflection | Laser Wavelength (e.g., ~ 1020 - ~ 1160 nm) | Keyhole, Depth, Splatter, Etc. |
| Visible | ~ 390 - ~ 700 nm | Size, Shape, Surface, Seam, Etc. |

TURBOCHARGER SHAFT AND WHEEL ASSEMBLY

TECHNICAL FIELD

Subject matter disclosed herein relates generally to turbomachinery for internal combustion engines and, in particular, to turbochargers.

BACKGROUND

Turbochargers are frequently utilized to increase output of an internal combustion engine. A turbocharger can include a turbine wheel welded to a shaft to form a shaft and wheel assembly (SWA). A SWA may be rotatably supported by a bearing or bearings to rotate at high rotational speeds. Various examples of techniques, technologies, etc. described herein pertain to turbocharger shaft and wheel assemblies.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
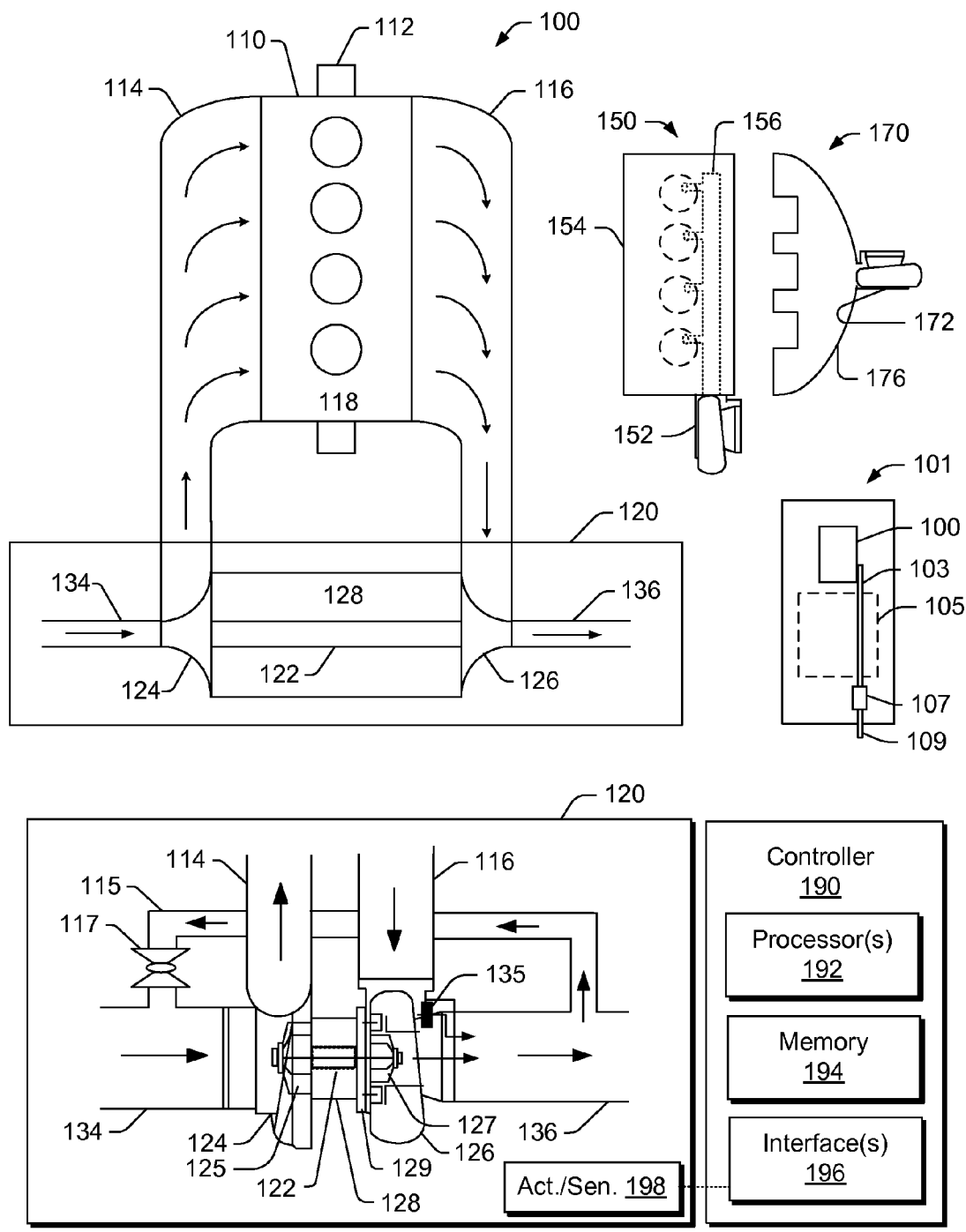
FIG. 1 is a diagram of an example of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
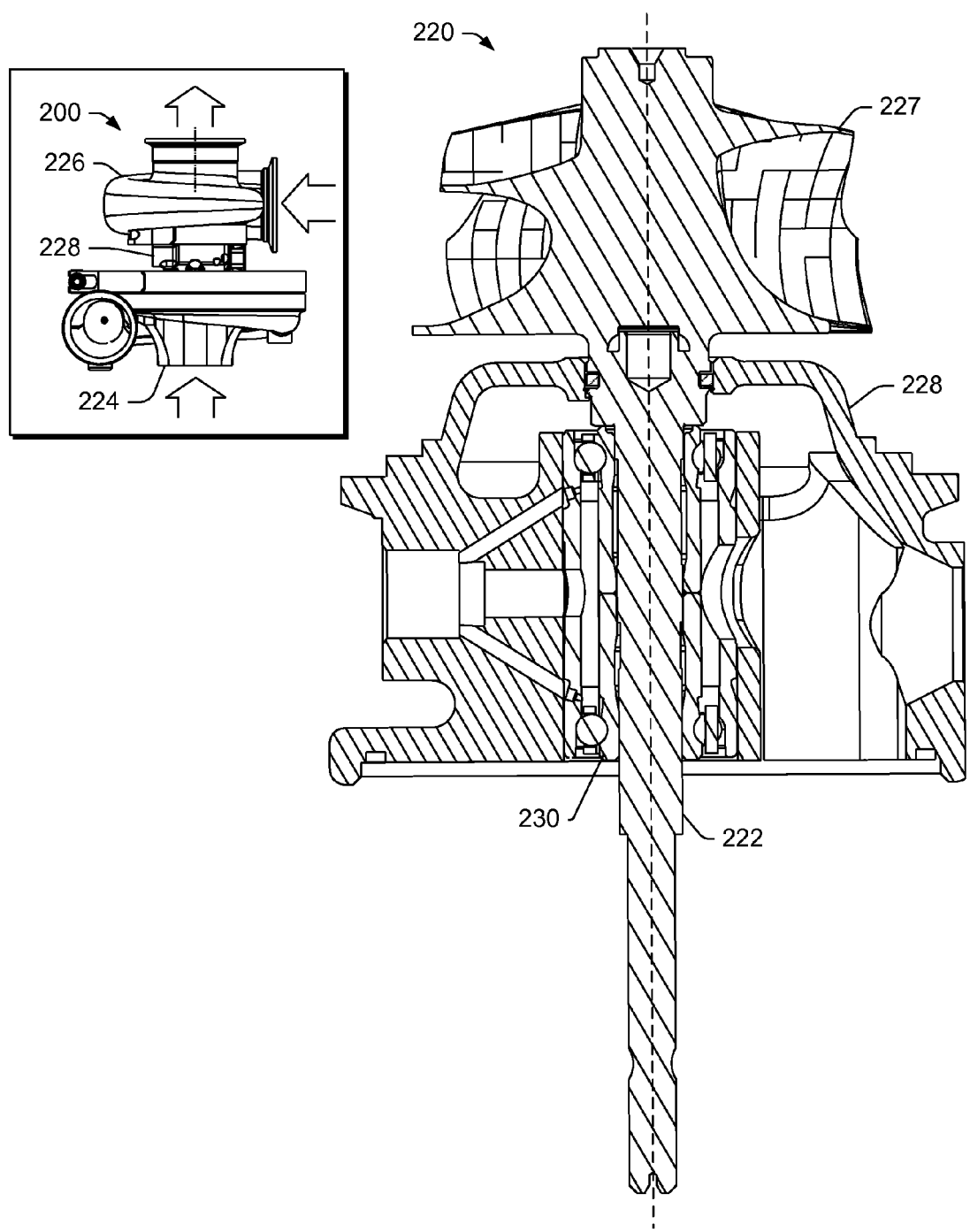
FIG. 2 is a diagram of an example of a turbocharger and a cross-sectional view of a portion of the turbocharger.

FIG. 2 shows an example of a turbocharger 200 that includes a compressor housing 224, a turbine housing 226 and a center housing 228. In a cross-sectional view of a portion of the turbocharger 200, a shaft and turbine wheel assembly (SWA) 220 is shown that includes a shaft 222 and a turbine wheel 227 that have been welded to form a unit (e.g., an SWA unit). In the example of FIG. 2, the center housing 228 includes a through bore that receives a bearing assembly 230 that rotatably supports the SWA 220. In the example of FIG. 2, the bearing assembly 230 includes an outer race, an inner race and rolling elements (e.g., balls) disposed between the outer and inner races; noting that a turbocharger may include one or more other types of bearings/bearing assemblies (e.g., consider a journal bearing, etc.). In the example of FIG. 2, the center housing 228 includes lubricant passages that can direct lubricant to the bearing assembly 230, for example, to lubricate rolling elements, and direct lubricant to surfaces within the center housing 228, for example, to form lubricant films (e.g., squeeze films, etc.).

In the example of FIG. 2, the SWA 220 includes an annular recess that seats a seal element such as, for example, a piston ring (e.g., or piston rings). These features may align with a bore surface of the center housing 228 and act to resist flow of exhaust from the turbine housing 226 to a cavity of the center housing 228 and flow of lubricant from the cavity of the center housing 228 to the turbine housing 226.

As mentioned, a shaft may be joined to a turbine wheel by welding. As an example, a joining process may act to minimize initial unbalance (e.g., distortion) and balance migration (e.g., non-symmetric residual stresses).

As an example, a system can include one or more units that can emit a beam or beams where the beam or beams carry energy sufficient to form a weld between a shaft and a turbine wheel. As an example, consider a system that can emit two or more beams that may be symmetrically oriented with respect to a cylindrical workpiece so that tacking or welding can be accomplished, for example, in a synchronized manner. In such an example, the system may act to minimize distortion from pull-back of a first weld spot (e.g., as may occur with a single beam approach to welding).

As an example, a system can include a laser unit that can emit a laser beam. In such an example, optics may be included in the system to direct the laser beam. As an example, optics may include a beam splitter such that a plurality of laser beams may be generated from a single beam. In such an example, the generated beams may be substantially the same with respect to their energy. As an example, a system can include a gas delivery subsystem, for example, to delivery inert gas that can act to form a shield with respect to a welding site or welding sites. As an example, a system can include one or more gas jets, for example, consider an cleaning jet that may emit an atmospheric plasma or carbon dioxide (e.g., dry-ice bombardment). As an example, a system can include rotating tooling that may be positionable for aligning of one or more workpiece. As an example, a system may include an option to switch from multiple beams to a single beam, for example, to allow for tack welding (e.g., at lower power and fuller penetration with higher power).

As an example, a system may include a welding cell. A welding cell may be a region where a workpiece or workpieces can be at least partially positioned for welding. As an example, locating tooling may be included in a system for positioning of one or more workpieces. As an example, tooling may be configured to rotate one or more workpieces, for example, at a selected velocity while welding occurs via one or more beams. In such an example, the one or more beams may be fixed and/or adjustable (e.g., via optics, positioning equipment, etc.). As an example, weld optics may be configured to be stationary during welding and yet moveable for purposes of alignment with respect to one or more workpieces.

As an example, a system can include a laser unit that is operatively coupled to optical fiber for delivery of one or more beams to weld optics (e.g., fiber, disc, etc.). As mentioned, a beam splitter may be employed to split a laser beam into two individual laser beams such that the two individual laser beams are "synchronized", as being daughters of a parent beam. As an example, a controller may be operatively coupled to equipment to adjust one or more parameters of a beam or beams.

As operational environments of a compressor wheel, a shaft and a turbine wheel differ, materials of construction and manners of construction of these components can also differ. For example, exhaust temperatures may exceed 500 degrees C. for a diesel engine and 1000 degrees C. for a gasoline engine thereby requiring high-temperature materials for turbine wheel construction. Further, while a shaft may be made of a moderate temperature resistant metal or metal alloy turned on a lathe, etc., a turbine wheel is typically cast using a high-temperature resistant ceramic, metal or metal alloy (e.g., consider austenitic nickel-chromium-based superalloys marketed under the brand INCONEL®, Special Metals Corporation, Huntington W. Va.).

INCONEL® alloys are predominantly nickel followed by chromium. For example, INCONEL® 625 is about 60 percent nickel, about 20 percent chromium, about 8 percent molybdenum, about 5 percent iron and the remainder other metals. Welding of INCONEL® alloys can present issues such as cracking and microstructural segregation of alloying elements in a heat-affected zone.

As an example, a material may include molybdenum. As an example, upon heating of such a material, molybdenum may form an oxide such as, for example, molybdenum trioxide ($MoO_3$). Molybdenum trioxide can have a melting point of about 795 degrees C. (e.g., about 1,463 degrees F.). As an example, an alloy such as AISI 4140 may have a melting point of about 1416 degrees C. (e.g., about 2,580 degrees F.). During a welding process, some amount of molybdenum oxide may form, which has a melting point less than that of bulk material. In such an example, upon cooling, one or more regions of molybdenum oxide may remain in a molten (e.g., liquid) state longer than surrounding material. In such an example, the amount of molybdenum oxide formed during a welding process may be minimal. As an example, where components are welded via one or more laser beams, a low molybdenum alloy may be employed for one or both of the components. As an example, a low molybdenum alloy may be one that has a molybdenum content less than one percent by weight. As an example, a low molybdenum alloy may be on that has a molybdenum content less than approximately 0.5 percent by weight. As an example, a low molybdenum alloy may include a molybdenum content by weight greater than about 0.1 percent and less than about 0.5 percent. As an example, each of the alloys AISI 4161, AISI 4121, AISI 4140, AISI 4120, and AISI 4118 include less than about 0.5 percent by weight molybdenum. As an example, a nickel-chromium-molybdenum steel may include a Mo content less than about 0.5. As an example, a nickel-molybdenum steel may include a Mo content less than about 0.5. As an example, a molybdenum steel may include a Mo content less than about 0.5 (e.g., 40XX and 44XX).

As to forming a weld or welds using one or more laser beams (e.g., fiber or disk), a spot size may be, for example, less than about 0.1 millimeters. Where such a spot size is used, along with a low-alloy steel shaft material, such as AISI 4140 (e.g., having a low molybdenum content, which is less than about 0.5 percent), risk of hot cracking may be reduced (e.g., substantially avoided). For example, in such a method, a weld or welds may be formed that are substantially free of detrimental hot cracking.

As an example, a turbocharger SWA can include a shaft portion made of a first material and a turbine wheel portion made of a second, different material. In such an example, welding involves forming a weld with two different materials. As an example, where a filler material is included at a joint prior to welding, yet another material may be present. As an example, a method can include joining of a Ni-based superalloy turbine wheel to a low-alloy steel shaft to form a shaft and wheel assembly (SWA) as a unit where joining includes welding with one or more beams. In such an example, the shaft may be formed of a low molybdenum material (e.g., Mo less than about 0.5 percent by weight).

Beam-based welding causes weld pool formation, which is followed by weld pool solidification. Various factors can influence weld characteristics. As an example, factors associated with a joint (e.g., joint interface) of dissimilar alloys can influence cracking. As another example, factors associated with a beam (e.g., continuous versus pulsed) can influence cracking.

Beam-based welding can generate a plasma plume, which includes ionized metal vapor. Plasma plume dynamics may exist, for example, where a recoil pressure may be exerted on a weld pool (e.g., which may act to flatten or otherwise shape a weld pool). As an example, increases in plasma plume intensity may also act to increase spatter ejection.

As an example, a system can include equipment to measure one or more characteristics of a plasma plume (e.g., size, height, chemical composition, etc.). As an example, a system can include equipment to relate one or more plasma characteristics to one or more welding parameters, for example, to control welding based at least in part on plasma plume analysis.

As an example, a system may employ keyhole welding. Keyhole welding may employ a beam with sufficient energy to penetrate into material, for example, to form a cavity filled with ionized metal vapor. A keyhole welding system may implement a laser unit that can generate a beam with a power density in excess of about 100,000 $W/mm^2$ (e.g., about $10^5$ $W/mm^2$). Such a level of power density may melt and partly vaporize workpiece material (e.g., or materials). Pressure of the generated vapor can displace molten material so that a cavity is formed (e.g., a keyhole). Inside a cavity, the absorption rate of laser radiation can increase due to multiple reflections in the cavity. For example, where the beam hits the wall of the cavity, a part of the beam energy can be absorbed by the material. Keyhole welding may be suitable for forming welds with depths greater than about 5 mm.

As mentioned, welding may form a plasma or plasma plume. For example, during penetration laser welding, temperature in a cavity (e.g., a keyhole) may rise to a level sufficient to ionize metal vapor. As a plasma may form at and about a weld site, a plasma may absorb a portion of a beam's energy. In such an example, plasma may act as an intermediary in an energy transfer process. As an example, evaporation pressure in a cavity may cause plasma to expand to a region outside of the cavity. In such an example, the plasma may at least partially defocus and scatter a beam, which may lead to a larger focus diameter and a change in the focus position and energy density. As an example, an extended plasma plume or cloud can cause penetration depth to decrease. A weld formed in the presence of a plasma plume may assume, in cross-section, a nail-head shape due at least in part to energy absorption in the plasma plume. If plasma formation is extensive, a welding process may even be interrupted. Plasma may be characterized by an emission of a bluish light. Plasma can include a mixture of metal atoms, ions, electrons and components of a surrounding gas atmosphere. In some instances, plasma may ignite, for example, where argon is used as a welding gas.

Plasma formation depends on energy, for example, power density. As an example, a high-power Nd:YAG laser may form plasma. However, when compared to a $CO_2$ laser, the presence of the plasma may differ due at least in part to the shorter wavelength of Nd:YAG laser radiation compared to the wavelength of $CO_2$ laser radiation (e.g., the shorter wavelength is absorbed less than the longer wavelength).

As mentioned, a system may include gas handling equipment that can generate, maintain, etc. a local atmosphere at a weld site. Such an atmosphere may effect welding and may optionally be used to tune a welding process. For example, an atmosphere may be controlled with respect to plasma formation, with respect to desired mechanical properties of a weld, with respect to blanketing and/or shielding effect(s), etc. As an example, gas handling equipment may include one or more nozzles that can delivery, aim, etc. gas with respect to one or more sites. As an example, a gas may include one or more of helium, argon, nitrogen, carbon dioxide, oxygen, etc. As an example, a gas may be or include air.

As an example, a gas may be employed that is inert. For example, helium and argon are inert gases that may not react with weld materials. In contrast, other welding gases or welding gas components, such as nitrogen, oxygen and carbon dioxide, may be reactive. A reactive gas may influence weld characteristics. For example, a reactive gas may influence pore formation during beam welding via instability of melt flow in a cavity (e.g., a keyhole). Instability of melt flow may trap vapor and/or welding gas in the form of bubbles that lead to pores upon solidification. As an example, fine-scale porosity may occur when pure nitrogen is used as a welding gas as nitrogen may dissolve into material(s). As the solubility of nitrogen tends to decrease as a material solidifies, gaseous nitrogen can lead to formation of pores. As air includes nitrogen, air may lead to nitrogen-based pores.

A plume may be formed during welding, which may be a plasma of workpiece material(s), gas, or both. As an example, a plume formed in a Nd:YAG laser welding process may include un-ionized vaporized materials and excited hot gas. As an example, shielding gas may not be ionized in a Nd:YAG laser welding process such that volume and morphology of a plume may be determined by thermal conductivity and density of the shielding gas rather than by its ionization potential.

As an example, a system may include equipment to perform plume analysis. As an example, a plume may be described with respect time (e.g., along a timeline). For example, at an initial time, a laser beam may be directed at material(s) such that surface absorption and material excitation occur followed by a temperature rise and thermal/non-thermal processes and surface melting. Next, a plasma may form followed by laser/photon reflection, plasma absorption and operation of a "self-regulating" regime. At about a microsecond after beam "impact", a plasma-ambient interaction may occur along with shockwave formation. A plasma may then decelerate and be confined and, thereafter, condense (e.g., at about a millisecond).

As an example, a system may include equipment to perform plume analysis using one or more techniques such as, for example, one or more of shadowgraphy, ICCD fast photography, optical emission spectroscopy, and crater analysis (e.g., using white-light interferometry, etc.). As an example, shadowgraphy and/or fast photography may provide information about hydrodynamic expansion of shock wavefronts and plasma plumes. As an example, optical emission spectroscopy (OES) may provide information about electron number density of plasmas during plume expansion.

Figure 3:
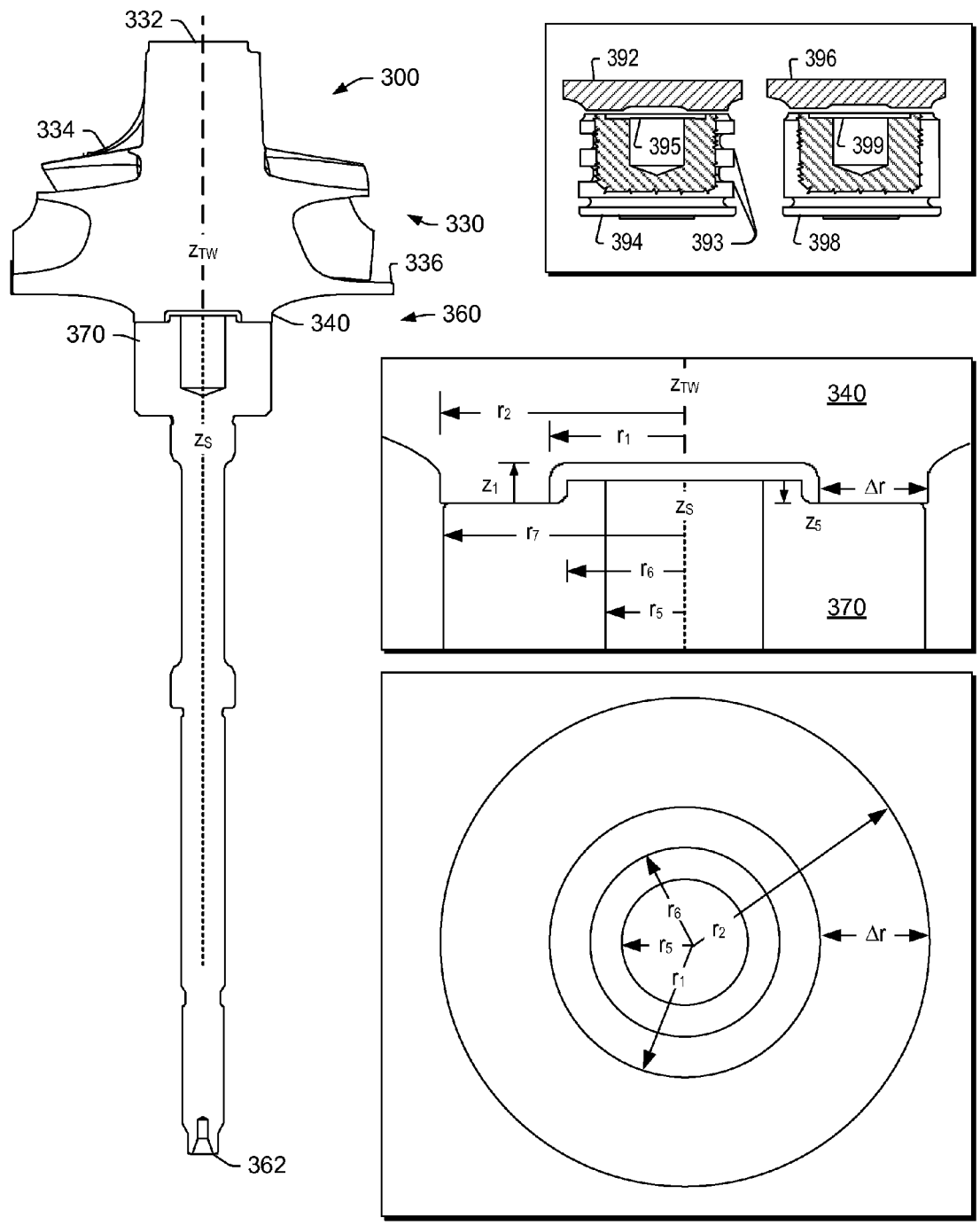
FIG. 3 is a diagram of an example of a shaft and turbine wheel assembly (SWA)

FIG. 3 shows an example of a SWA 300 that includes a turbine wheel 330 and a shaft 360. The turbine wheel 330 includes a nose 332, blades 334, a hub edge 336 and a hub end 340. The shaft 360 includes a compressor wheel end 362 and a turbine wheel end 370. As shown, the hub end 340 of the turbine wheel 330 can form a joint with the turbine wheel end 370 of the shaft 360.

FIG. 3 also shows an example of a hub end 392 and a turbine wheel end 394 and an example of a hub end 396 and a turbine wheel end 398. As illustrated, a shaft may include features such as a recessed weld pool reservoir (e.g., to receive a tip of a weld pool tongue), one or more seal element grooves, etc. For example, the turbine wheel end 394 can include at least one annular grooves 393 and the turbine wheel ends 394 and 398 can each include a recess 395 and 399, respectively, with an axial depth and an outer diameter that may define a reservoir (e.g., a chamber) that can receive spillover, etc. of a weld pool or weld pools upon welding of the components 392 and 394 or the components 396 and 398.

The hub end 340 and the turbine wheel end 370 may be defined with respect to various dimensions, shown in an enlarged cross-sectional view. For example, the hub end 340 includes radial dimensions $r_1$ and $r_2$ measured from a turbine wheel axis $z_{TW}$ and an axial dimension $z_1$ measured from a surface of the hub end 340. The turbine wheel end 370 is shown as including radial dimensions $r_5$, $r_6$ and $r_7$ measured from a shaft axis $z_S$ and an axial dimension $z_5$ measured from a surface of the turbine wheel end 370.

Figure 4:
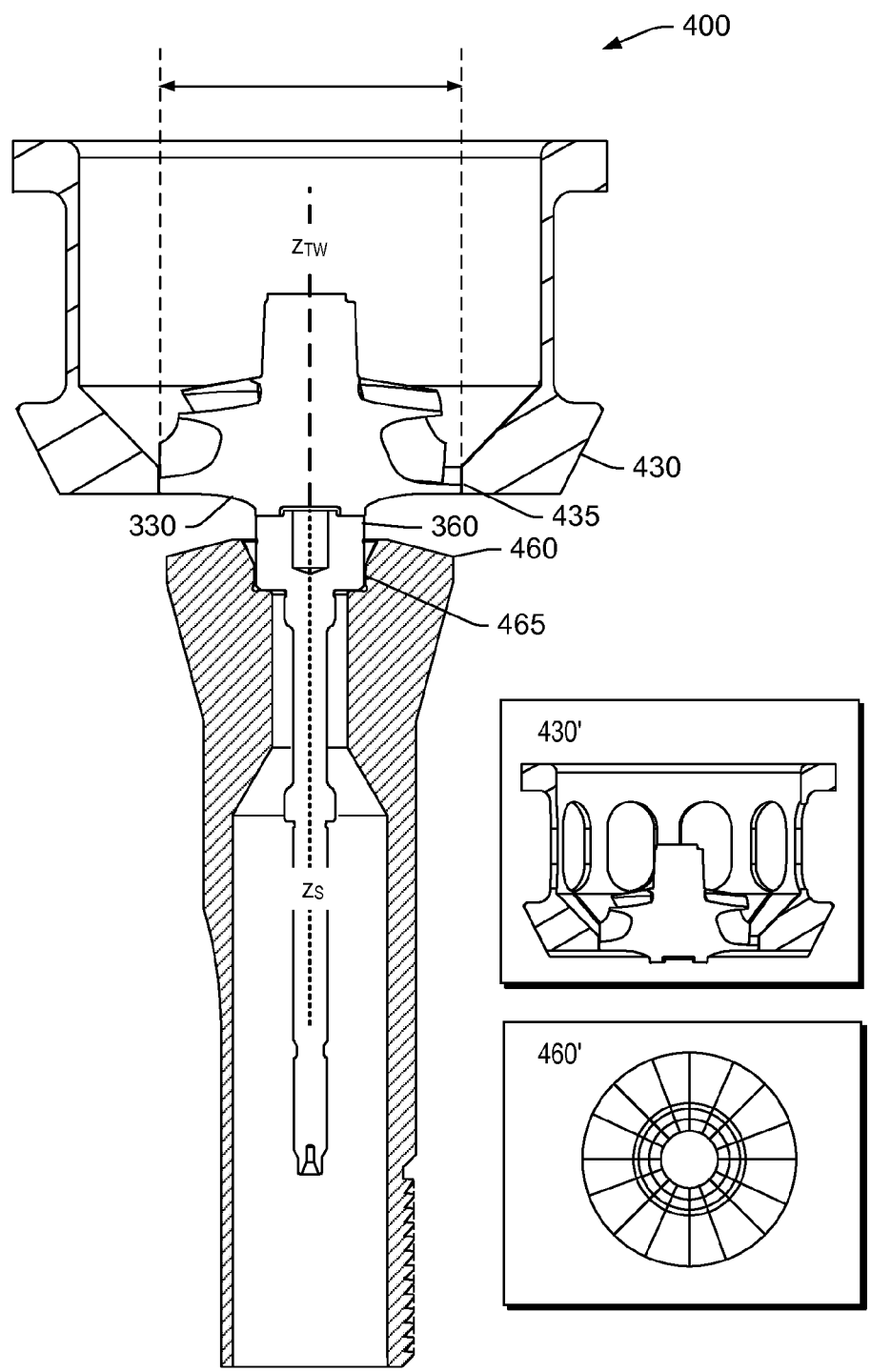
FIG. 4 is a diagram of an example of an assembly.

As an example, a system can include collets that can position the turbine wheel 330 with respect to the shaft 360. For example, FIG. 4 shows an example of an assembly 400 that includes an example of a turbine wheel collet 430 and a shaft collet 460. As shown, the collets 430 and 460 may co-axially locate the turbine wheel 330 and the shaft 360 and may therefore be referred to as centering collets.

The turbine wheel collet 430 includes a centering portion 435 with a surface (e.g., or surfaces) that defines an inner diameter that is slightly larger than the outer diameter of the hub edge 336 of the turbine wheel 330. One or more radial clearances may exist between the hub edge 336 and the centering portion 435. Such a clearance or clearances limit movement of the turbine wheel 330, particularly tilting movement of the turbine wheel 330.

As an example, the collet 430 may include features that provide resiliency. For example, FIG. 4 shows an example of a collet 430' that includes a series of gaps between individual extensions that can be brought closer together (e.g., to at least partially close the gaps) via application of force to the collet 430'. In such an example, the collet 430' may contact the hub edge 336 of the turbine wheel 330. Such contact may be forcible contact such that the collet 430' grips the turbine wheel 330 (e.g., clamps the turbine wheel 330). As an example, the collet 430 may be a spring collet where the centering portion 435 may be adjusted to minimize clearance with the hub edge 336 of the turbine wheel 330 to, for example, contact and optionally forcibly contact the hub edge 336 of the turbine wheel 330.

As shown in FIG. 4, the shaft collet 460 includes a centering portion 465 with surfaces that define an inner diameter as well as an axial stop. In the example of FIG. 4, the inner diameter is sufficient to receive the shaft 360 such that it can be axially located and limited in its ability to tilt. As an example, the collet 460 may include features that provide resiliency. For example, FIG. 4 shows an example of a collet 460' that includes a series of gaps between individual extensions that can be brought closer together (e.g., to at least partially close the gaps) via application of force to the collet 460'. In such an example, the collet 460' may contact the shaft 360. Such contact may be forcible contact such that the collet 460' grips the shaft 360 (e.g., clamps the shaft 360). As an example, the collet 460 may be a spring collet where the centering portion 465 may be adjusted to minimize clearance with the shaft 360 to, for example, contact and optionally forcibly contact the shaft 360.

As an example, the hub end 340 of the turbine wheel 330 may contact the turbine wheel end 370 of the shaft 360, under the influence of gravity and/or via applied force. In the example of FIG. 4, a line-of-sight gap exists with respect to a joint formed by the hub end 340 of the turbine wheel 330 and the turbine wheel end 370 of the shaft 360. As an example, one or more of the collets 430 and 460 may be rotatable such that, for example, the turbine wheel 330 and the shaft 360 may be rotated in unison. In such an example, a line-of-sight gap may allow for rotation of the turbine wheel 330 and the shaft 360 with respect to a beam or beams that may deliver energy suitable for weld formation to weld the turbine wheel 330 and the shaft 360 to form a SWA (e.g., a SWA unit).

Figure 5:
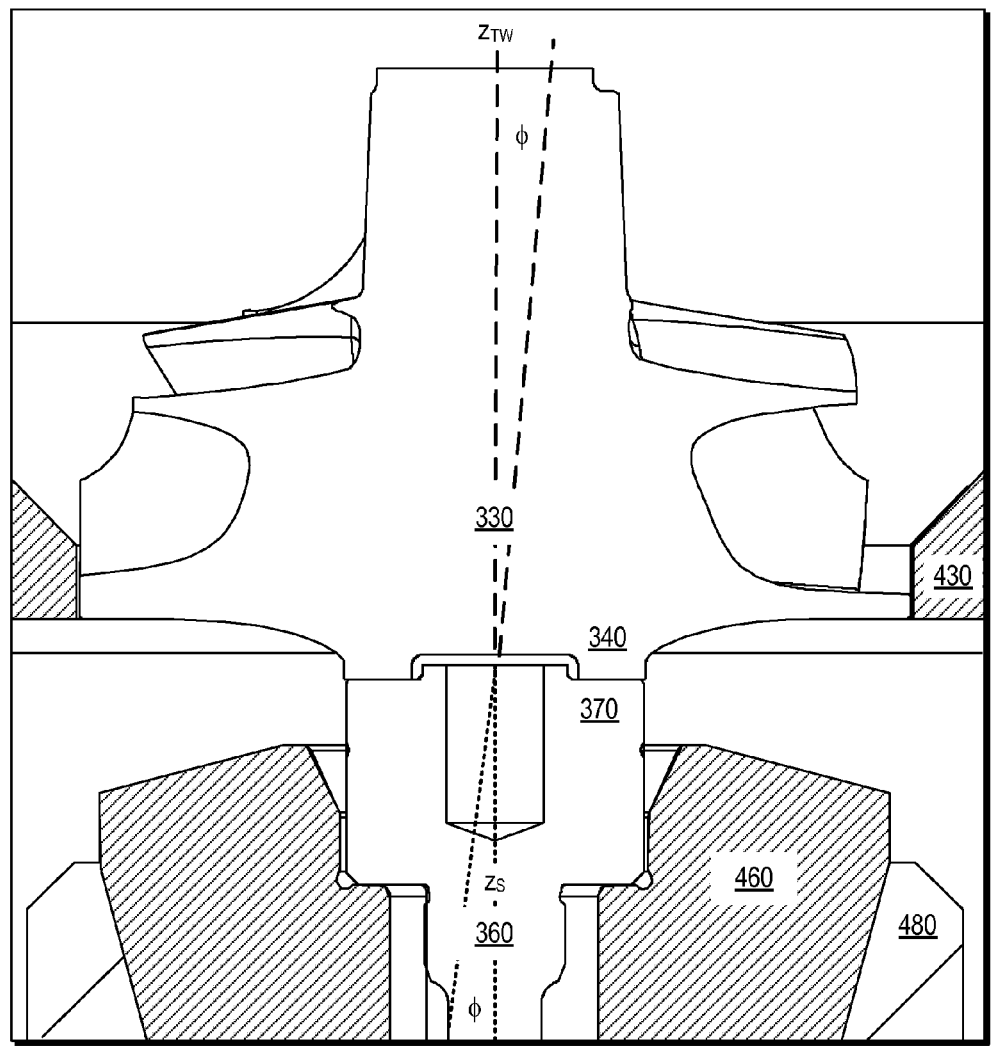
FIG. 5 is a diagram of a portion of the assembly of FIG. 4 that illustrates limited tilt.
Figure 5:
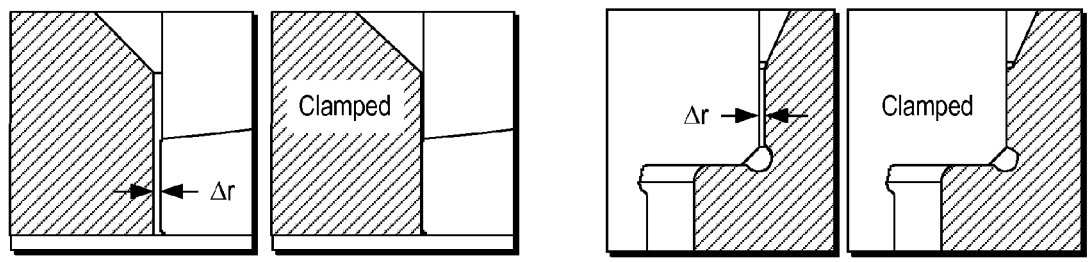

As mentioned, the collets 430 and 460 may be centering collets that limit tilt of a turbine wheel and a shaft. FIG. 5 shows an enlarged view of the assembly 400 of FIG. 4 where tilt angles are shown, as being limited in part by clearances. As an example, where the collet 430 is a spring collet, force may be applied to diminish the clearance and/or to bring the collet 430 into contact with the turbine wheel 330 (see, e.g., clamped arrangement). As an example, where the collet 460 is a spring collet, force may be applied to diminish the clearance and/or to bring the collet 460 into contact with the shaft 360 (see, e.g., clamped arrangement). As an example, the component 480 may include an angled surface such as a conical surface and the collet 460 may include an angled surface such as a conical surface whereby movement of the component 480 with respect to the collet 460 may cause the collet 460 to clamp the shaft 360. In the example of FIG. 4, clamping may fix an alignment of the axis $z_{TW}$ of the turbine wheel 330 with respect to the axis $z_S$ of the shaft 360 (e.g., to substantially co-axially align $z_{TW}$ and $Z_S$).

As an example, the collet 430 of FIG. 5 may include features of the collet 430' of FIG. 4. As an example, the collet 460 of FIG. 5 may include features of the collet 460' of FIG. 4.

Figure 6:
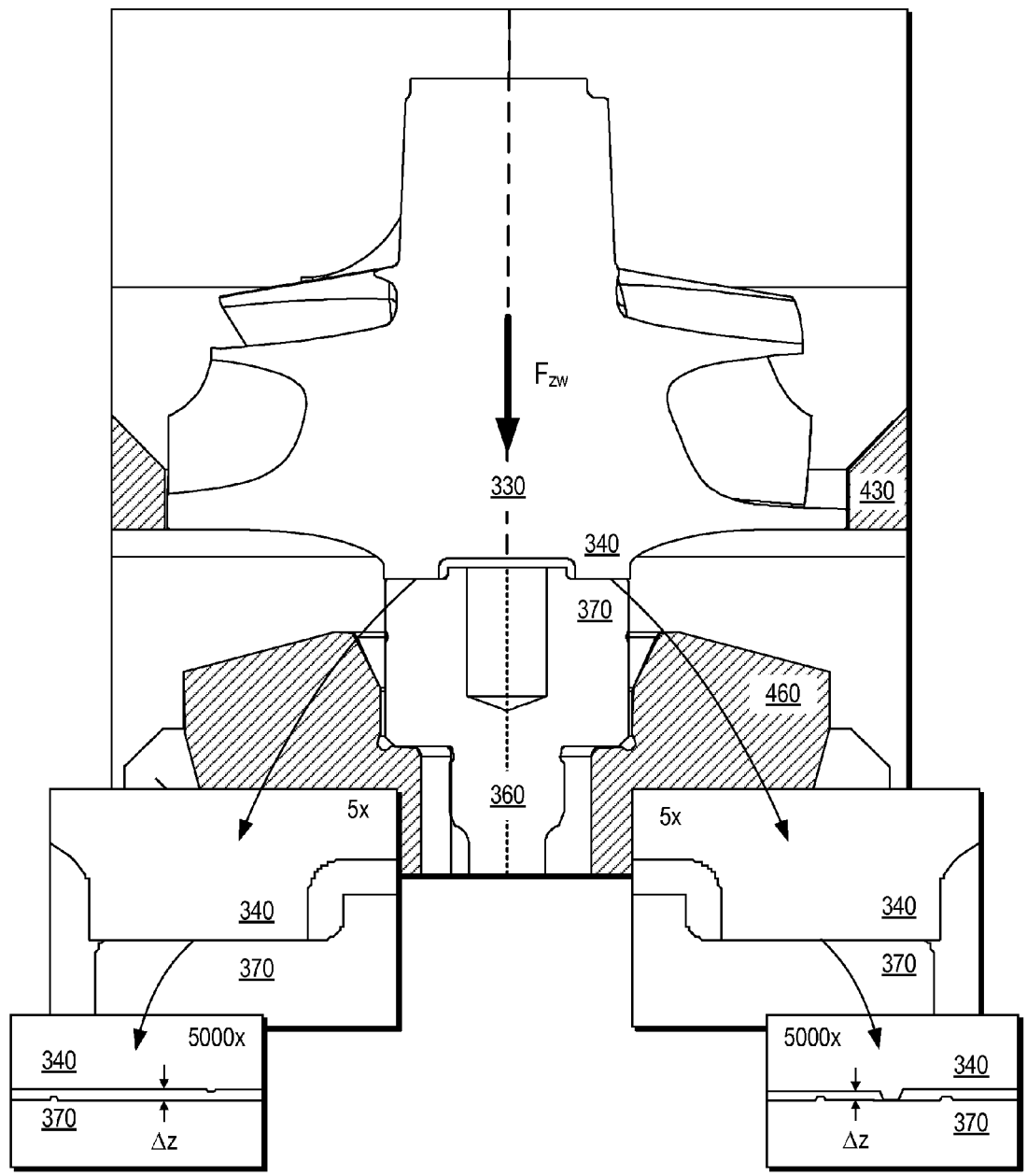
FIG. 6 is a diagram of a portion of the assembly of FIG. 4 that illustrates clearances and contact(s)

As mentioned, the turbine wheel 330 may contact the shaft 360 as included in the assembly 400. FIG. 6 shows an enlarged view of the assembly 400 of FIG. 4 where clearances and contacts are illustrated. As an example, the collet 430 may center the turbine wheel 330 in a manner where contact occurs at a single point (see, e.g., the illustration in the lower right). As an example, contact may occur within limits of tilt, which via clamping may be substantially or wholly negated (see, e.g., clamped arrangements of FIG. 4).

As an example, upon clamping of the turbine wheel 330 via the collet 430 and/or clamping of the shaft 360 via the collet 460, contact between the turbine wheel 330 and the shaft 360 may be fixed. As an example, a method may include adjusting azimuthal position of the turbine wheel 330 and/or the shaft 360 to achieve a particular type of contact. For example, if a "bump" meets a "bump", rotation of the turbine wheel 330 and/or the shaft 360 may occur to re-position such that the bumps meet plateaus. In such an example, a seam width as defined by the turbine wheel 330 and the shaft 360 may be determined and/or adjusted (see, e.g., Δz). As indicated, the seam width may depend locally on surface features of the hub end 340 of the turbine wheel 330 and/or surface features of the turbine wheel end 370 of the shaft 360.

Figure 7:
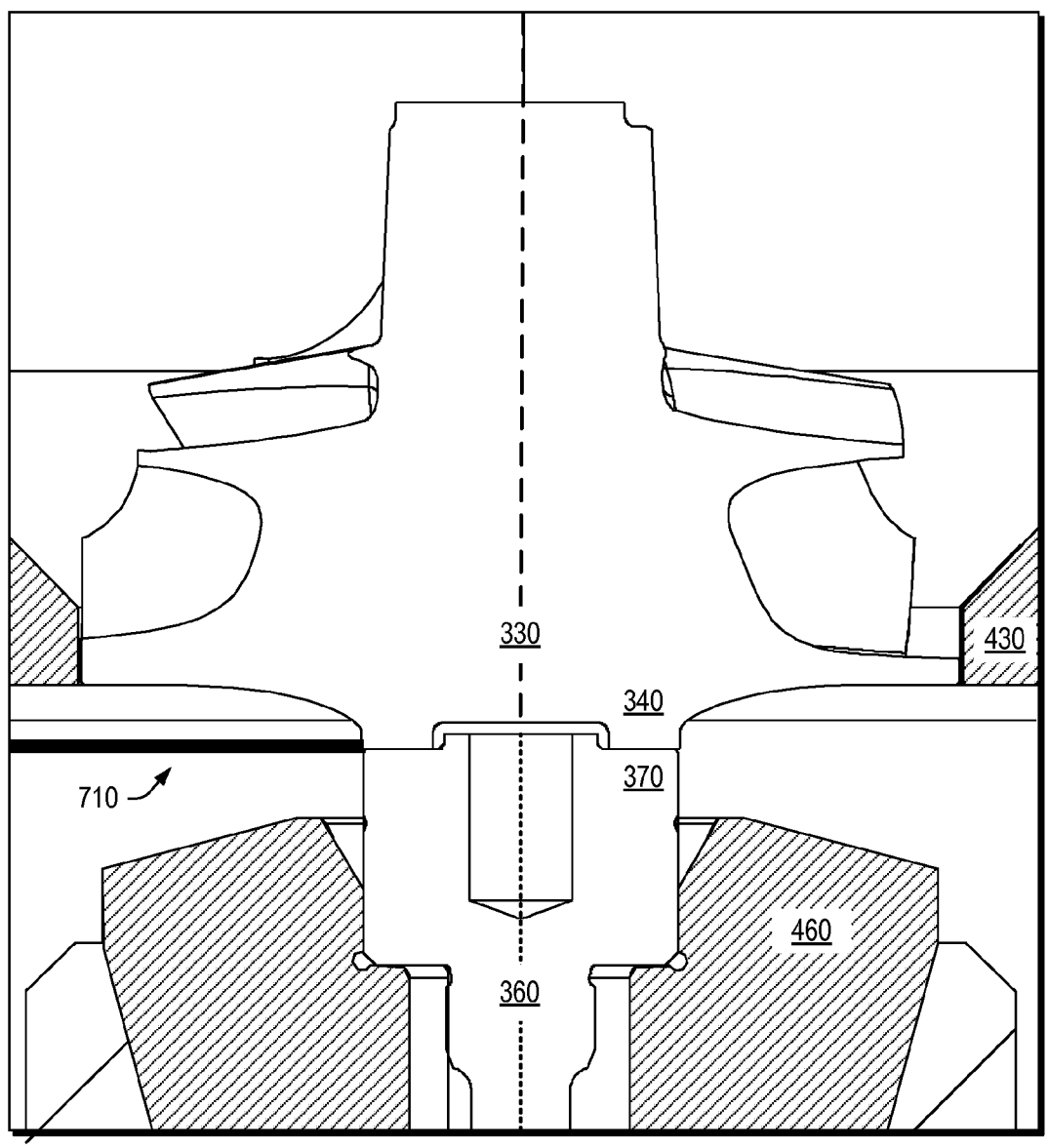
FIG. 7 is a diagram of a portion of the assembly of FIG. 4 that illustrates a beam for welding.

As mentioned, a welding process may include directing one or more beams at or proximate to a joint. FIG. 7 shows an enlarged view of the assembly 400 of FIG. 4 where a beam 710 is directed at the joint formed by the hub end 340 of the turbine wheel 330 and the turbine wheel end 370 of the shaft 370. In such an example, the beam 710 is in a line-of-sight gap where the turbine wheel 330 and the shaft 360 may be rotated in unison such that the beam can cover at least a portion of a 360 degree extent of the joint.

Figure 8:
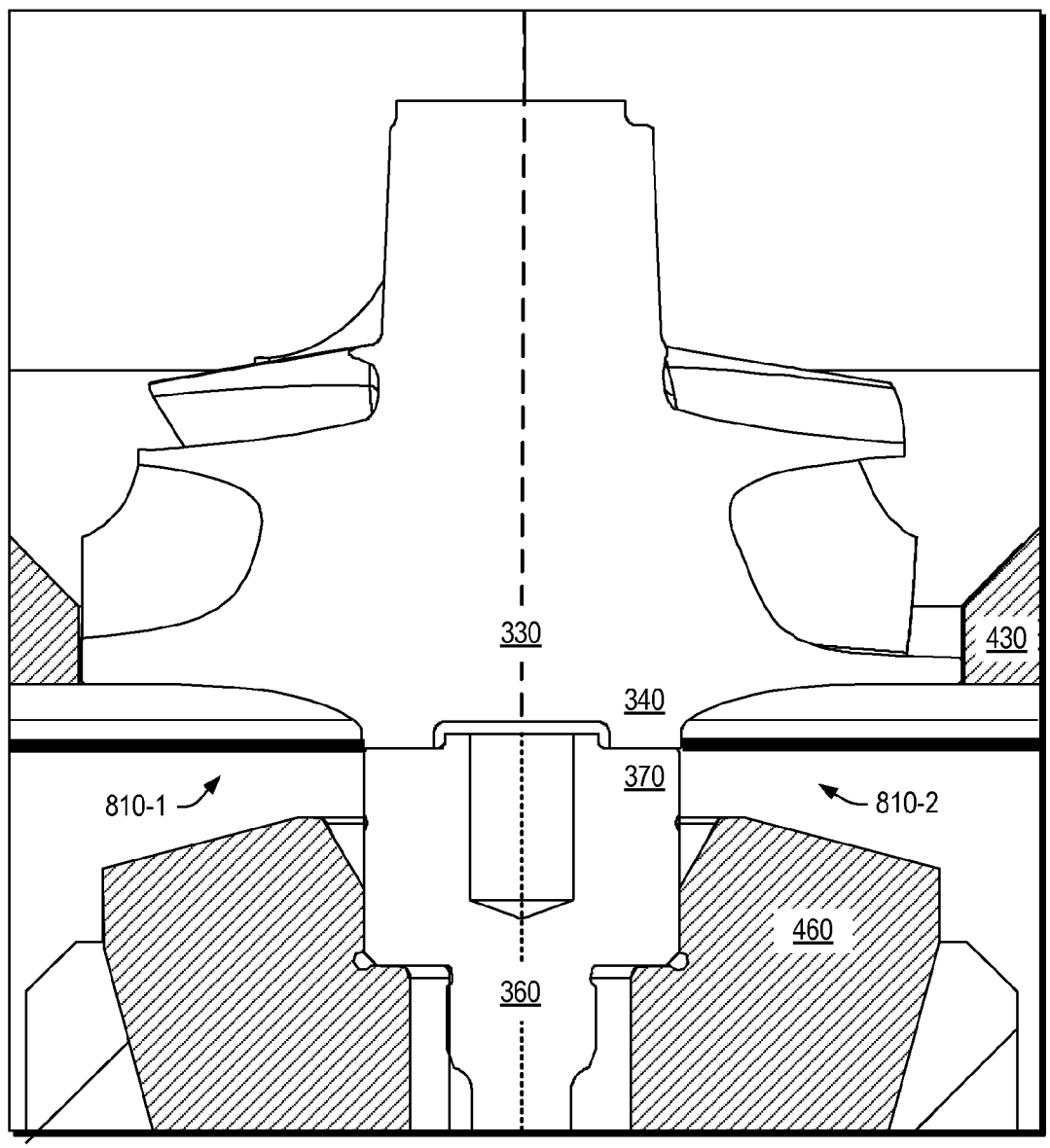
FIG. 8 is a diagram of a portion of the assembly of FIG. 4 that illustrates beams for welding.

FIG. 8 shows an enlarged view of the assembly 400 of FIG. 4 where a plurality of beams 810-1 and 810-2 are directed at the joint formed by the hub end 340 of the turbine wheel 330 and the turbine wheel end 370 of the shaft 370. In such an example, the beams 810-1 and 810-2 are in a line-of-sight gap where the turbine wheel 330 and the shaft 360 may be rotated in unison such that each of the beams 810-1 and 810-2 can cover at least a portion of a 360 degree extent of the joint.

Figure 9:
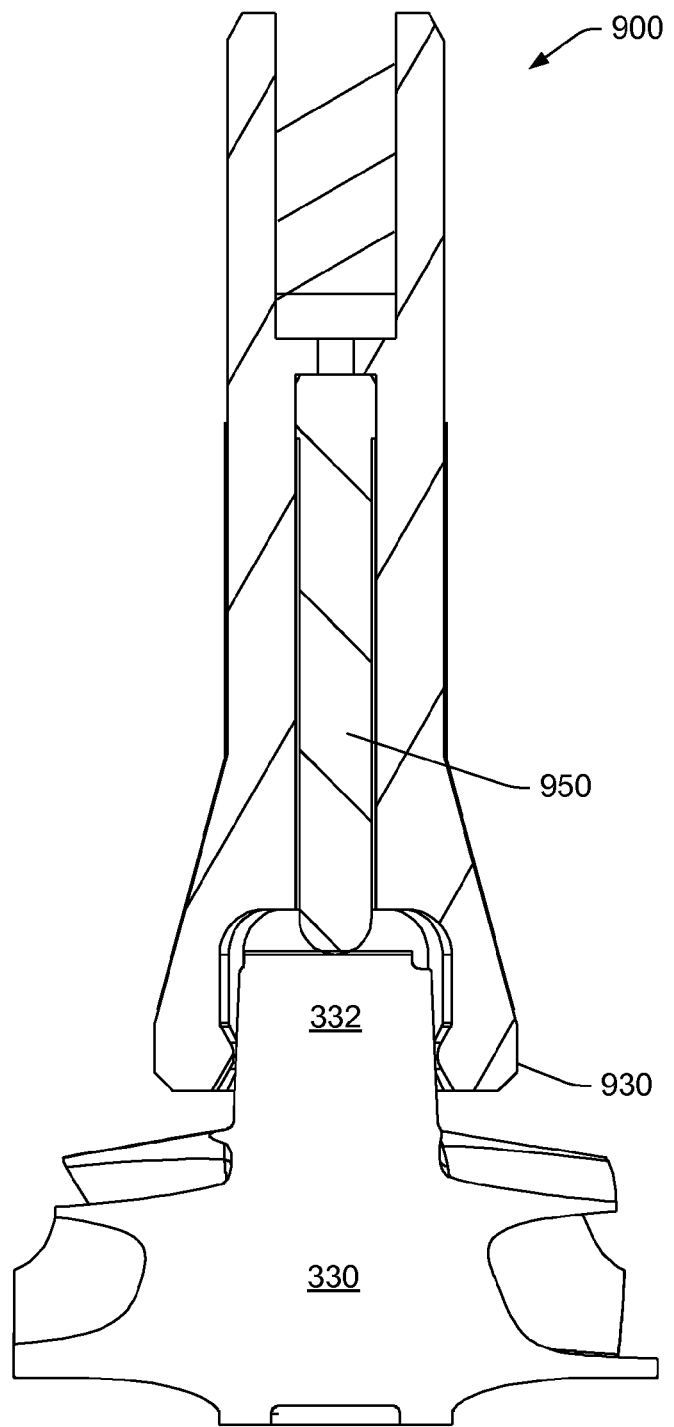
FIG. 9 is a diagram of an example of a force applicator assembly.

FIG. 9 shows an example of a force applicator assembly 900 that includes a clamp 930 and a translatable force applicator 950. As shown, the force applicator 950 may apply force to the nose 332 of the turbine wheel 330. Such force may be transferred to the shaft 360 via the hub end 340 of the turbine wheel 330. In such an example, the centering ability of the collet 430 may limit tilt of the turbine wheel 330 such that contact as illustrated in FIG. 6 is maintained.

As an example, force may be applied in a manner that acts to diminish clearance or clearances at a joint (e.g., a joint interface, a seam, etc.). As an example, the force applicator assembly 900 may be controlled to apply force, optionally in a manner responsive to analysis of a joint (e.g., as to one or more points of contact, clearances, etc.). In such an example, a clearance or clearances may be reduced (e.g., seam width reduction, etc.), for example, to reduce beam penetration depth, etc., which may otherwise create damage inside a joint cavity (e.g., by entering the gap or gaps). As an example, where the turbine wheel 330 is clamped by a collet such as the collet 430 (e.g., or the collet 430'), force applied by a force applicator may be transferred to the collet. For example, the collet as clamped to the turbine wheel may travel axially with a turbine wheel.

As an example, a force applicator may be controlled with respect to a minimum force and a maximum force. As an example, a force may be selected and optionally adjusted based at least in part on one or more desired weld characteristics (e.g., for a SWA unit). As an example, a method may include adjusting force during a welding process or welding processes (e.g., which may employ multiple beams). As an example, a maximum force may be based at least in part on limiting run-out level after welding. In such an example, run-out may be caused during welding as a melt mix of materials from two components begins to become weak on a first angular sector such that one component moves axially toward the other component, however, with some amount of inclination (e.g., shrinkage with tilt). While run-out may not impact metallurgy (e.g., weld quality), it impacts SWA geometry.

As an example, a method may include applying a force of about 100 N or less or, for example, a force of about 30 N or less. As an example, a method may include applying force within a range of about 20±10 N. As an example, a method may include monitoring shrinkage, run-out, etc. and adjusting force, for example, during welding. As an example, a method may include sensing tilt of one or more components and adjusting one or more parameters of welding. As an example, a tilt sensing technique may operate with respect to one or more tilt limits. For example, consider a tilt limit that is not to exceed about several hundred microns as to an axis or axes for purposes of quality control. As an example, a tilt angle may be minimal as an axis of a clamped turbine wheel and an axis of a clamped shaft may be substantially co-axially aligned (see, e.g., FIG. 5).

As an example, a method can include applying force to a turbine wheel where, for example, the force is less than approximately 100 N. In such an example, the force may be limited to a force equal to or less than approximately 30 N.

As an example, a force applicator may apply a force responsive to a force applied via another component. For example, a shaft centering collet may apply force to a shaft that applies force to a turbine wheel where the turbine wheel applies force to a force applicator that may be in contact (e.g., direct or indirect) with the turbine wheel. For example, the force applicator 950 of the force applicator assembly 900 may apply a "reaction" force responsive to an "action" force (e.g., applied to a turbine wheel via a shaft). As an example, a turbine wheel centering collet may be clamped to a turbine wheel and be used to apply an axial force to the turbine wheel (e.g., transferred via contact along a hub edge of the turbine wheel). In such an example, the turbine wheel may transfer force to a shaft (e.g., or vice versa).

Figure 10:
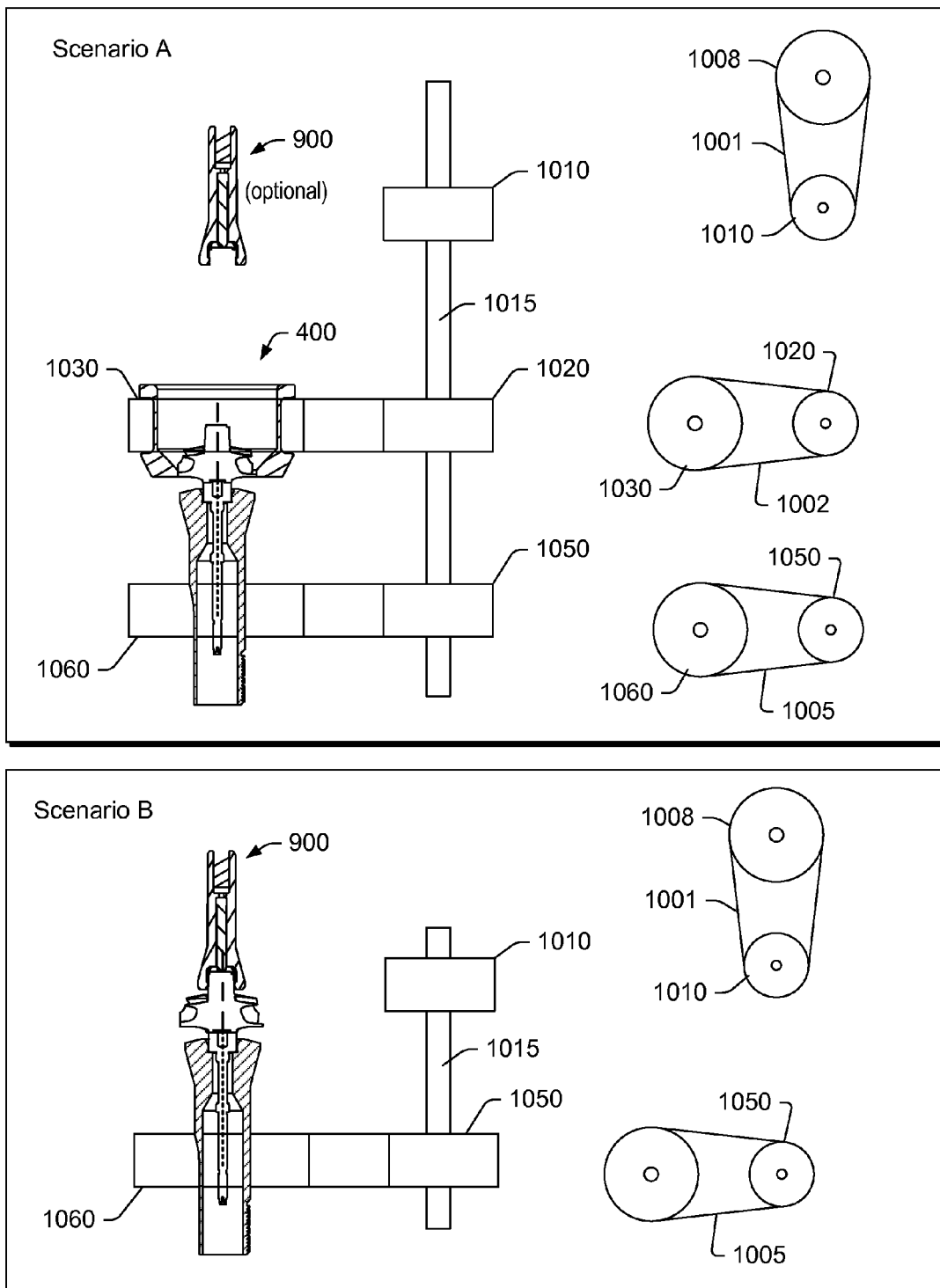
FIG. 10 is a series of diagrams of examples of rotation mechanisms.

FIG. 10 shows examples of assemblies for a scenario A and for a scenario B where the assemblies include mechanisms for rotating equipment. For example, in the scenario A and in the scenario B, the assemblies can include a motor driven wheel 1008 that includes a belt 1001 coupled to a master wheel 1010. The master wheel 1010 may be fixed to a shaft 1015 that can drive one or more secondary wheels 1020 and 1050. As shown, the secondary wheels 1020 and 1050 may be coupled to respective belts 1002 and 1005 to drive tertiary wheels 1030 and 1060 that, in the scenario A, are operatively coupled to respective collets 430 and 460 of the assembly 400. In the scenario B, the tertiary wheel 1030 can rotate the collet 460 where the force applicator assembly 900 may also rotate. For example, the force applicator 950 may be configured to apply a force to the turbine wheel and rotate with the turbine wheel as coupled to the shaft via one or more points of contact. As an example, the clamp 930 may be configured to rotate. As an example, the clamp 930 and the force applicator 950 may be configured to rotate. As an example, the force applicator assembly 900 may include or may be operatively coupled to one or more bearings (e.g., rolling element bearings, etc.). As shown in FIG. 10, the scenario A may optionally employ the assembly 900 or a portion thereof.

As an example, in the scenario B, a shaft may include a piloting spigot and a turbine wheel may include a piloting bore. As an example, in the scenario A, a shaft may include a piloting spigot and a turbine wheel may include a piloting bore or, for example, a shaft may be without a piloting spigot and a turbine wheel may be without a piloting bore.

As an example, a rotation speed during a welding process may be about several rotations per minute to about one hundred rotations per minute and optionally more.

Figure 11:
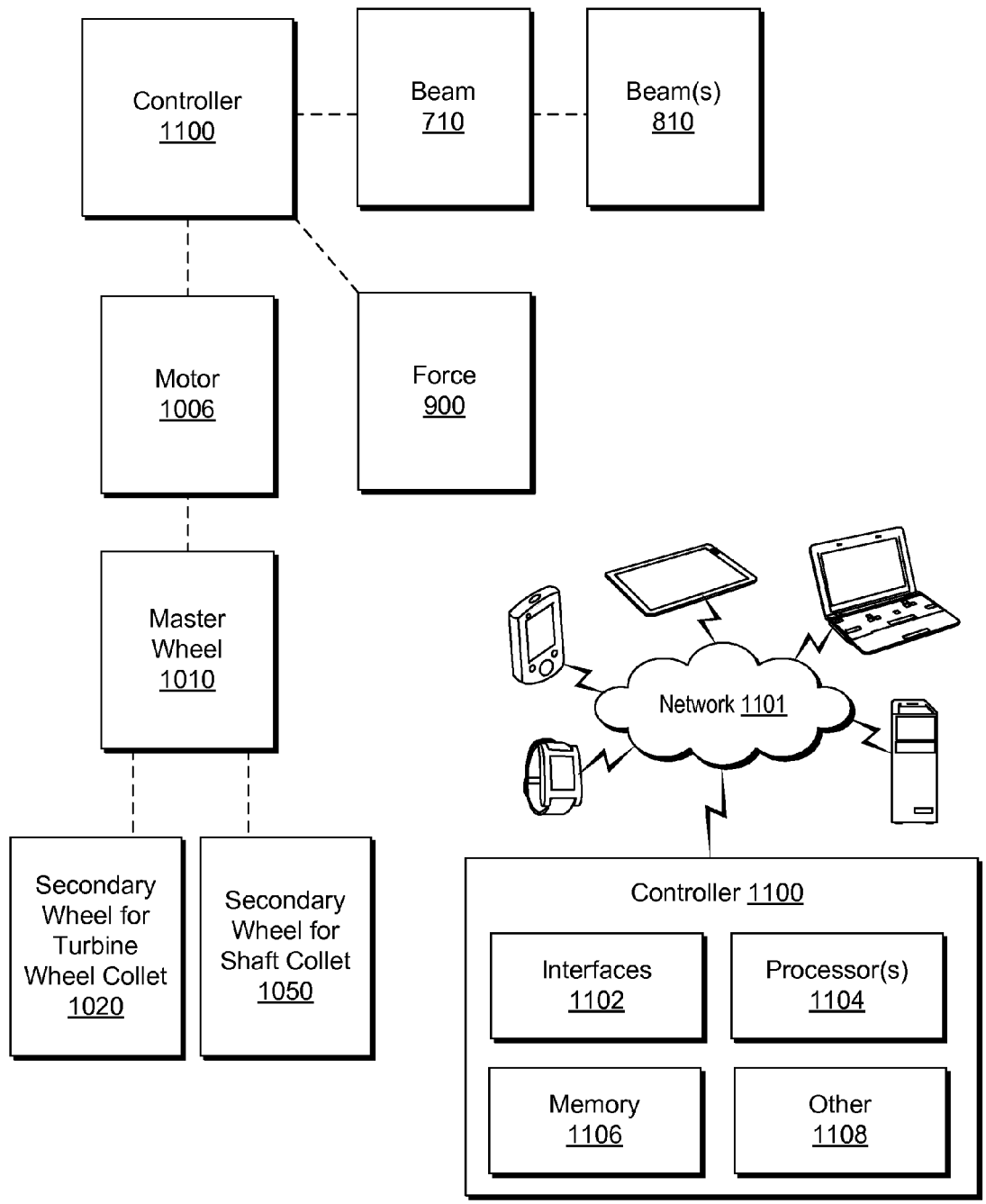
FIG. 11 is a diagram of an example of a controller.

FIG. 11 shows an example of a controller 1100 that may be implemented to control various components of a system. For example, the controller 1100 may include circuitry that can control a motor 1006 (e.g., operatively coupled to the wheel 1008), the master wheel 1010 (e.g., direction, position, speed, acceleration, etc.), the secondary wheel 1020 (e.g., direction, position, speed, acceleration, etc.) and/or the secondary wheel 1050 (e.g., direction, position, speed, acceleration, etc.). The controller 1100 may include circuitry to control the beam 710 and/or one or more of the beams 810-1 and 810-2. The controller 1100 may include circuitry to control the force applicator assembly 900 (e.g., the force applicator 950, etc.). As explained below, the controller 1100 may include circuitry to control one or more other features of a system.

FIG. 11 also shows the controller 1100 as including one or more interfaces 1102, one or more processors 1104, memory 1106 and one or more other components, circuitry, etc. As an example, the one or more interfaces 1102 can include one or more network interface, for example, to communicatively couple the controller 1100 to a network 1101 (e.g., or networks). As shown, the network 1101 may provide for transmission and/or receipt of information (e.g., sensed information, analyzed information, commands, quality information, etc.). As an example, a local or a remote an operator may have a mobile computing device that can be coupled to the controller 1100. In such an example, the operator may monitor one or more processes, control one or more processes, etc.

Figure 12:
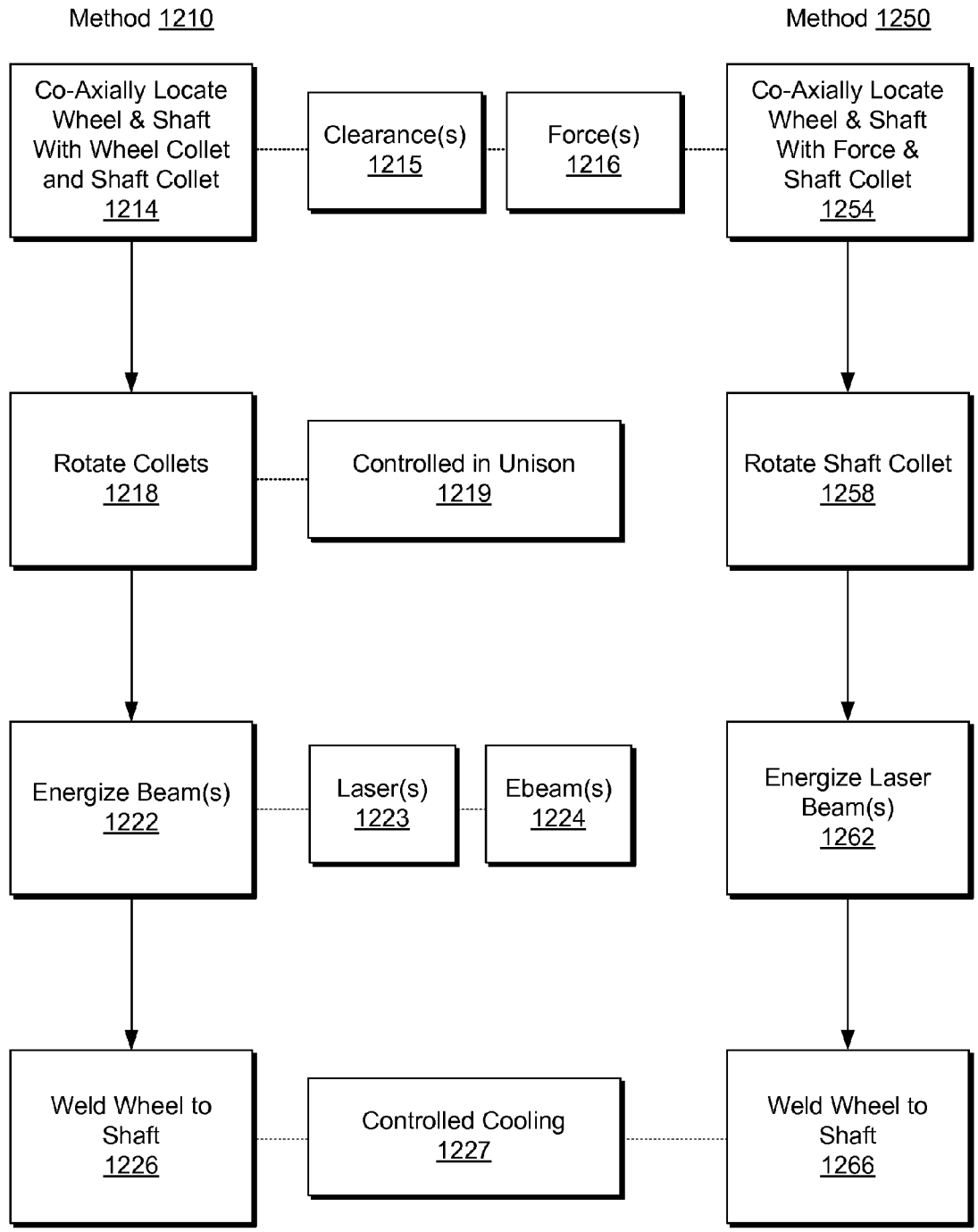
FIG. 12 is a diagram of an example of a method.

FIG. 12 shows an example of a method 1210 that includes a locate block 1214 for co-axially locating a turbine wheel and a shaft with a turbine wheel collet and a shaft collet, a rotate block 1218 for rotating the collets, an energize block 1222 for energizing one or more beams, and a weld block 1226 for, via the one or more beams, welding the turbine wheel to the shaft. In such an example, the locate block 1214 may include forming one or more clearances per a block 1215 and/or applying force or forces per a block 1216. In such an example, a force may be an axial force, a force may be a radial force or forces may include axial and radial forces. As mentioned, a collet may be a spring collet that can clamp a component. For example, a spring turbine wheel collet may clamp a turbine wheel and a spring shaft collet may clamp a shaft (see, e.g., clamped arrangements of FIG. 4). As to application of axial force, as an example, a force applicator such as the force applicator 950 may be implemented to apply an axial force to a turbine wheel where such force may be transmitted at least in part to a shaft (e.g., upon contact between the turbine wheel and the shaft).

As an example, the rotate block 1218 may include controlling rotation of the turbine wheel and the shaft in unison per a block 1219. As an example, the energize block 1222 can include energizing one or more laser beams per a block 1223 and/or energizing one or more ebeams per a block 1224. As an example, the weld block 1226 can include cooling per a block 1227. Such cooling may include temperature control via one or more mechanisms such as, for example, via conduction, evaporation, condensation, convection, radiation, etc.

FIG. 12 also shows an example of a method 1250 that includes a locate block 1254 for co-axially locating a turbine wheel and a shaft where a force applicator applies an axially directed force to the turbine wheel, where the turbine wheel transfers at least a portion of the force to the shaft and where a rotatable shaft collet supports the shaft; a rotate block 1258 for rotating the rotatable shaft collet; an energize block 1262 for energizing at least one laser beam; and a weld block 1266 for, via the at least one laser beam, forming a weld between the turbine wheel and the shaft. In such an example, the locate block 1254 may include forming one or more clearances per a block 1215 and/or applying one or more forces per a block 1216. For example, the shaft collet may apply a radial force to the shaft to clamp the shaft while the force applicator applies an axial force to the turbine wheel where the turbine wheel transfers at least a portion of the force to the shaft. As an example, the rotate block 1258 may include controlling rotation of the turbine wheel and the shaft in unison via rotation of the shaft collet. As an example, the weld block 1266 can include cooling per a block 1227. Such cooling may include temperature control via one or more mechanisms such as, for example, via conduction, evaporation, condensation, convection, radiation, etc.

Figure 13:
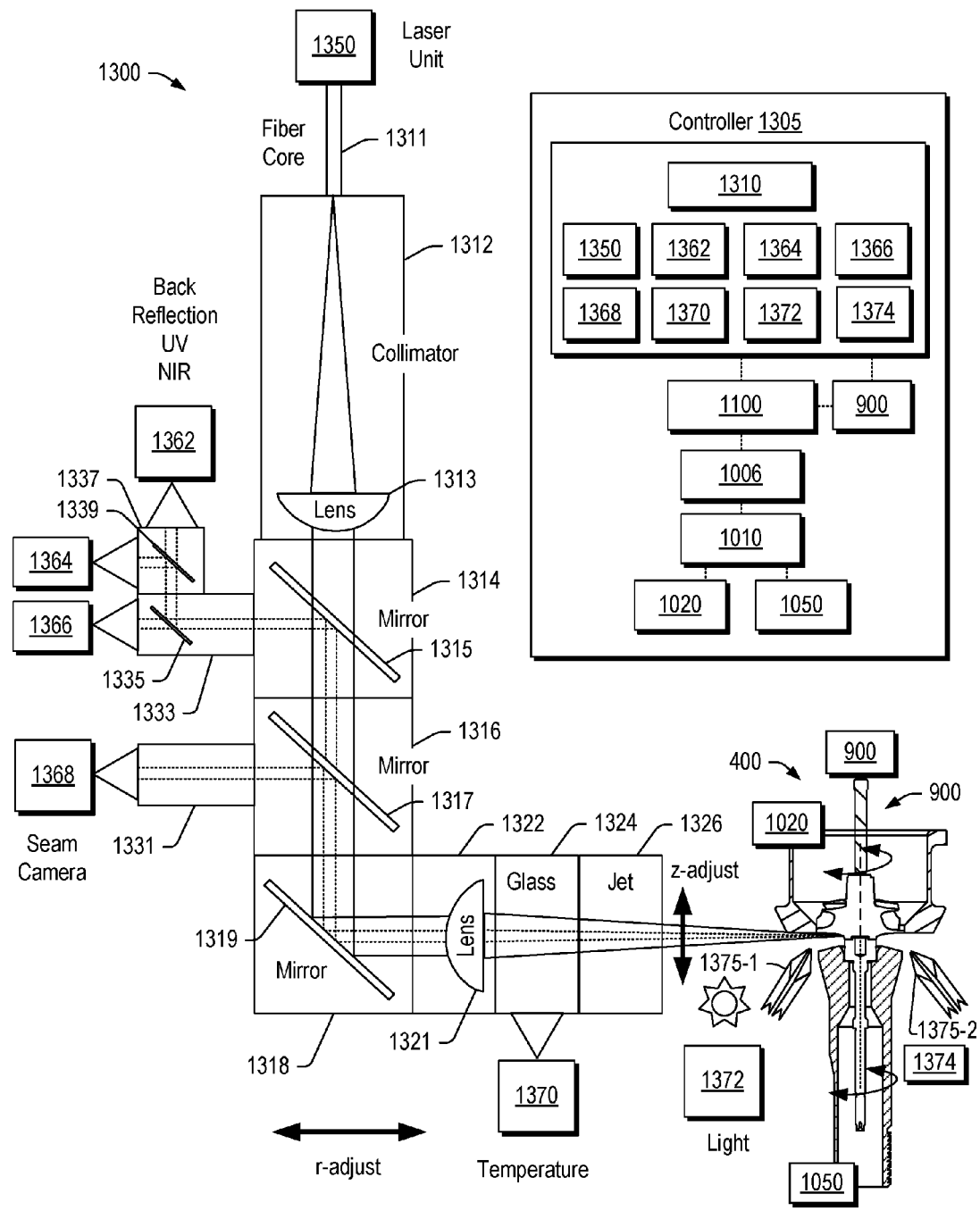
FIG. 13 is a diagram of an example of a system.

FIG. 13 shows an example of a system 1300 that includes a controller 1305. As shown in the example of FIG. 13, the system 1300 can include a fiber core 1311 that can transmit a laser beam, a collimator 1312, optics 1313 (e.g., one or more lenses), a first mirror chamber 1314, a first mirror 1315, a second mirror chamber 1316, a second mirror 1317, a third mirror chamber 1318, a third mirror 1319, an optics chamber 1322, optics 1321, a protection unit 1324 and a jet unit 1326.

As an example, the system 1300 may be implemented for the scenario A of FIG. 10 and/or for the scenario B of FIG. 10. For example, a laser unit 1350 may direct a laser beam via the aforementioned components to a line-of-sight gap of the assembly 400 (e.g., optionally without the turbine wheel collet 430), which may include one or more parts of the force applicator assembly 900 (see, e.g., the force applicator 950) and rotation mechanisms such as, for example, one or more of the secondary wheels 1020 and 1050.

As illustrated in FIG. 13, the system 1300 may include position adjustment mechanisms that can adjust laser associated components in a radial and/or an axial direction with respect to the assembly 400 (e.g., or a portion thereof). In such a manner, a focal point, a beam spot, etc. may be adjusted with respect to one or more workpieces such as a turbine wheel and a shaft. For example, a beam spot may be positioned to be centered slightly above a joint (e.g., a seam) such that energy is directed more towards the hub end of the turbine wheel. In such a manner, a weld pool may be formed that includes more material of the turbine wheel than material of the shaft. In such an example, the turbine wheel may be an alloy that includes nickel whereby a weld pool is formed that includes a concentration of nickel that is greater than a 50/50 mix of the alloy and a material of the shaft.

As an example, a beam spot (e.g., cross-section orthogonal to beam axis) may include a shape such as, for example, a Gaussian shape. Such a beam may include a spot size defined by a diameter or by a radius (e.g., "R"). A beam may include a beam waist along a beam axis, which may be a minimum spot size. As an example, where a beam contacts a component, the spot size may be defined where contact occurs. For example, a beam may include a beam waist that may be offset from where the beam contacts an object (e.g., or objects). As an example, for a beam propagating in free space, a spot size radius may be defined as w(z) where the following equation may define variation of spot size along the beam axis: $w(z)=w_0(1+(z/z_R)^2)^{0.5}$. In such an example, $z_R$ may be the Rayleigh range (e.g., $\pi w_0^2/\lambda$). As an example, a depth of focus may be defined as $b=2z_R$. As an example, where an offset exists between a waist center (e.g., minimum spot size at $w_0$) and a contact surface (e.g., upon initiation of welding), the offset may be within the depth of focus. As an example, during welding, a beam may penetrate to a depth beyond that of an initial contact surface.

As an example, a welding process can include aligning two or more beams to a seam before welding. In such an example, an intended axial offset from a seam may be imparted such that energy is more directed to a turbine wheel than a shaft (e.g., in a range of about 50 percent to about 80 percent). As an example, a welding process may operate within multiple beams that are aligned axially within a limit or limits, for example, to maintain weld pool compositions for each weld portion within a limit or limits. Such an approach may act to maintain metallurgical properties of multiple weld pools within one or more property ranges. As an example, for a process that employs multiple beams, an axial offset limit for the multiple beams may be, for example, less than about 0.1 millimeter.

The system 1300 of FIG. 13 is also illustrated as including equipment blocks 1362, 1364, 1366, 1368, 1370, 1372 and 1374. As an example, the blocks 1362, 1364 and 1366 may include sensors and sensor circuitry for sensing back reflection, UV energy, near IR (NIR) energy, IR energy, etc. For example, a welding process may generate different types of energy that can be transmitted to the blocks 1362, 1364 and 1366 via a branch chamber 1333 of the first mirror chamber 1314 where the branch chamber 1333 can include a mirror 1335 that can pass some of the energy to the block 1366 while directing some of the energy to a sub-branch chamber 1337 that may include a mirror 1339 to direct some of the energy to the block 1364 and some of the energy to the block 1362.

As an example, the block 1372 may be a light source that can emit light with one or more wavelengths of the electromagnetic spectrum (e.g., UV, NIR, IR, VIS, etc.). Such energy may be transmitted to the second mirror chamber 1316 where the second mirror 1317 directs at least a portion of the energy to a branch chamber 1331 where it may be further transmitted to the block 1368, which may be a camera. For example, the block 1368 may include an OES, an ICCD, etc. As an example, the block 1368 may include a high-speed image sensor that can capture video of a collet, collets, a turbine wheel, a shaft, a beam, a gap, a plume, scattering energy, scattering material, a weld, etc.

As to the block 1374, it may include one or more nozzles 1375-1, 1375-2 that can direct gas toward and/or away from a region generally between the collets. For example, the block 1374 may direct gas toward a joint, toward a plasma, etc. As an example, the block 1374 may act as part of a temperature control mechanism. For example, the block 1374 may direct gas via one or more nozzles (e.g., jets) to adjust a temperature of a turbine wheel, a shaft, a turbine wheel and a shaft, etc. As an example, a nozzle and/or nozzles may rotate, may translate, etc. As an example, the block 1374 may provide a shielding gas. As an example, the block 1374 may perform multiple functions.

In the example of FIG. 13, the controller 1305 is shown as including various blocks such as those of the controller 1100 of FIG. 11. As an example, a block 1310 may include circuitry to receive and/or transmit information with respect to the laser unit 1350 and one or more of the blocks 1362, 1364, 1366, 1368, 1370, 1372 and 1374. The controller 1305 may provide for control of a welding process that welds a turbine wheel and a shaft to form a SWA (e.g., a SWA unit).

Figure 14:
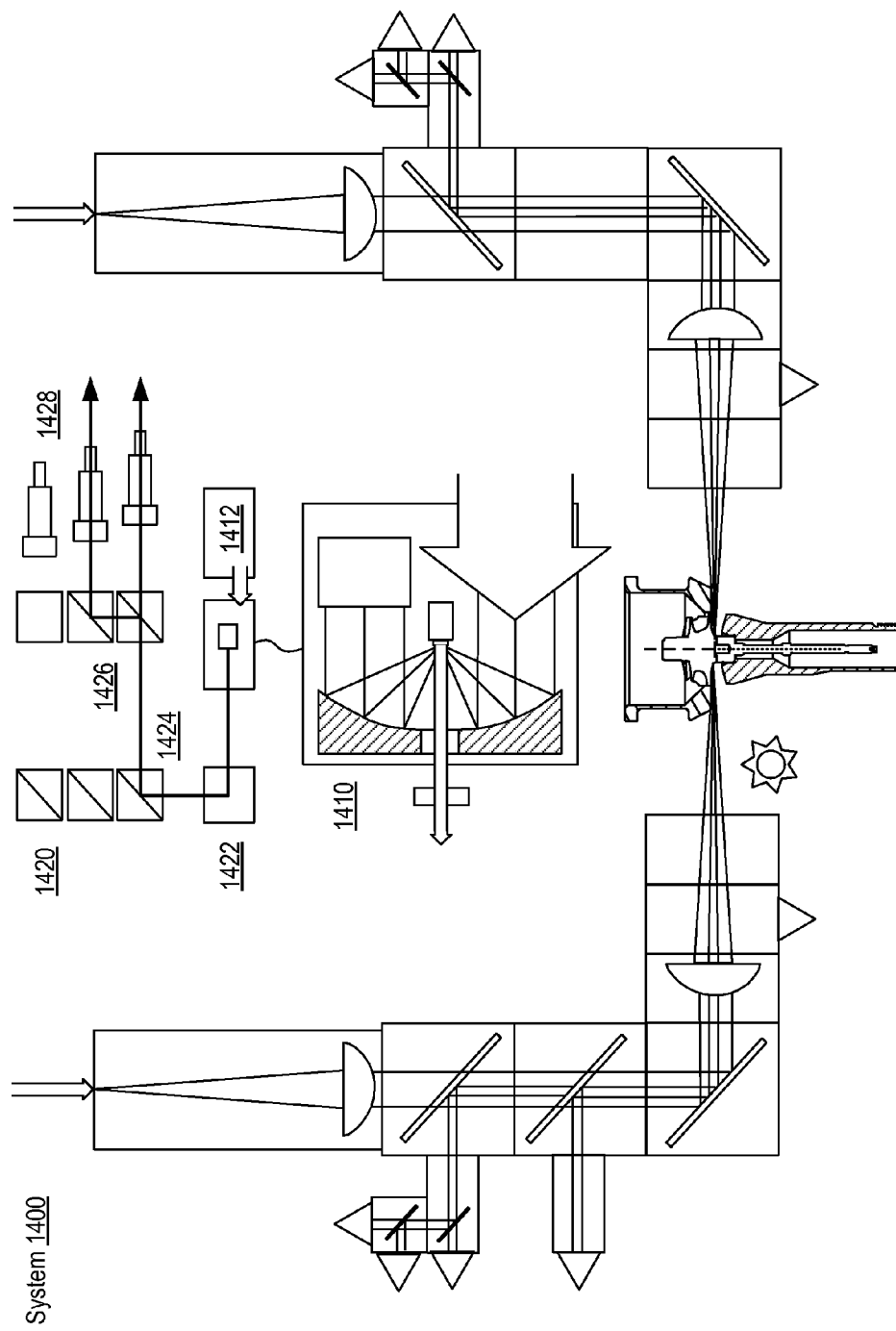
FIG. 14 is a diagram of an example of a system.

FIG. 14 shows an example of a system 1400 that can include multiple branches for multiple beams. In such an example, a single beam unit may generate a beam that can be split into multiple beams where each of the beams may be directed via its own beam path.

As an example, the system 1400 can include a disk laser module 1410 that may feed a distribution subsystem 1420. As an example, the disk laser module 1410 can include a diode-pumped thin-disk laser operating at about 1030 nm. For example, consider a pumping unit 1420 that includes diodes with energy emission at about 941 nm where such energy can be directed to a Yb:YAG disk of the disk laser module 1410.

A thin-disk laser may include an active medium with a thickness of about 200 µm or less. For example, a Yb:YAG active medium is crystalline and can be stimulated on one side via a diode laser stack in a quasi-end-pumped configuration while a another side is cooled. Optics can include a parabolic mirror and a retro-reflective mirror where not-absorbed power can be imaged multiple times, for example, to optimize efficiency. As an example, a single disk may produce up to about 3.5 kilowatts of power, operating in the near-infrared (NIR) at a wavelength of about 1030 nm. As an example, multiple disks may be cascaded to achieve higher power levels. A controller may provide for selection of different laser parameters such as, for example, operational mode, power level, and beam quality. A Yb:YAG disk laser may generate a smaller beam size (e.g., spot size) than a Nd:YAG laser, which, in turn, may allow for high energy density.

In the example of FIG. 14, the distribution subsystem 1420 receives a laser beam from the disk laser module 1410. The distribution subsystem 1420 is shown as including a power control unit 1422, switches 1424, splitters 1426 and couplings 1428. Such couplings may direct individual laser beams to paths of the system 1400, for example, to perform welding via one or more laser beams.

As an example, one or more sensors may sense information that may be suitable for detection of a change in power of one or more laser beams (e.g., an indirect detection technique). As an example, a direct technique may be implemented to detect a change in power of one or more laser beams. For example, consider a sensor that senses information associated with a protective window cartridge through which a laser beam passes and/or a power cassette that may be implemented, for example, as an alternative to a protective window.

As to one or more sensors, consider as an example one or more of a temperature sensor, a back reflection sensor, a plasma sensor and a camera (e.g., a CMOS camera, etc.). As an example, a sensor such as a temperature sensor, a back reflection sensor or a plasma sensor may operate at sampling rates of the order of about tens of kilohertz. As an example, a camera sensor may operate at a sampling rate of the order of about a thousand hertz.

As to a power sensor for sensing laser power directly, a welding head can include a protective window cartridge that can provide temperature information from which power of a laser beam may be determined. As an example, a power sensor for sensing laser power directly may include components for laser power calorimetrically. For example, an absorber may be radiated by at least a portion of a laser beam for a defined time period where thermal capacity and temperature rise of the absorber are known. Given such information, laser power can be calculated.

Referring again to the controller 1422 of FIG. 14, a closed-loop technique may be implemented as to power control where, for example, one or more sources are regulated where the one or more sources create a laser beam (see, e.g., the pumping diodes 1412).

As an example, a laser beam may be characterized, for example, by one or more of beam power, beam diameter and beam position of an unfocussed beam, beam diameter and beam position in the focus and polarization of the beam.

Figure 15:
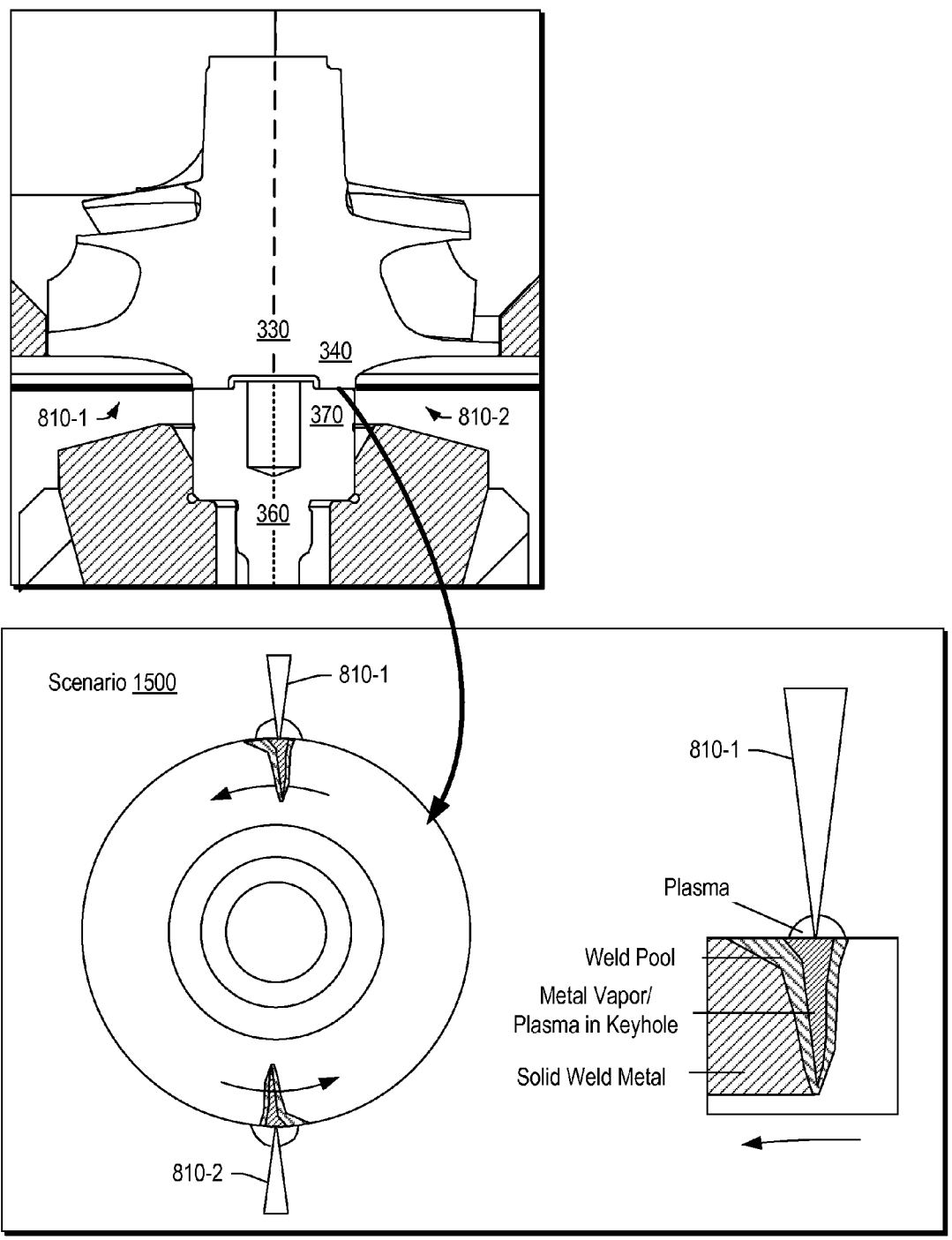
FIG. 15 is a diagram of an example of a welding scenario.

FIG. 15 shows an example scenario 1500 with respect to the example assembly of FIG. 8, which includes the beam 810-1 and the beam 810-2 being directed toward a joint formed by the hub end 340 of the turbine wheel 330 and the turbine wheel shaft end 370 of the shaft 360. The scenario 1500 indicates a direction of rotation of the turbine wheel 330 and the shaft 360 and formation of individual weld regions. As illustrated for the beam 810-1, a weld pool may be formed along with one or more plasmas. As an example, a depth of penetration of a beam may be controlled, for example, to control at least in part weld depth. For example, a keyhole depth may be controlled to form a weld between the hub end 340 and the turbine wheel shaft end 370.

As an example, the system 1400 of FIG. 14 may be employed to form the weld regions of the scenario 1500. The system 1400 can include various features of the system 1300 of FIG. 13. As an example, the controller 1305 may be configured to control the system 1400. For example, the controller 1305 may control the beams 810-1 and 810-2 of the scenario 1500 and/or one or more other parameters associated with a welding process (e.g., or welding processes). As an example, control may include one or more of position control, rotation control, gas control, temperature control, energy control, focal point control, beam spot size control, plasma control, etc.

Figure 16:
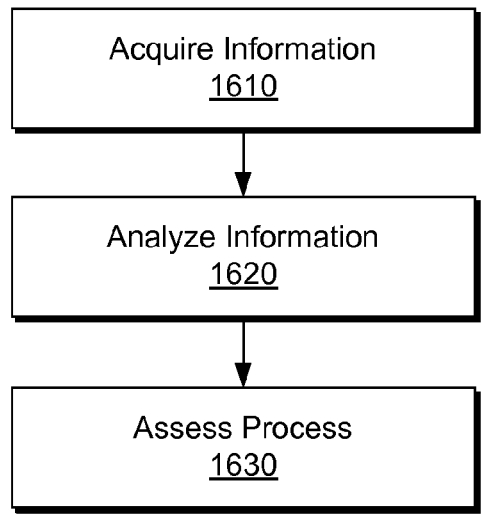
FIG. 16 is a diagram of an example of a method.
Figure 16:
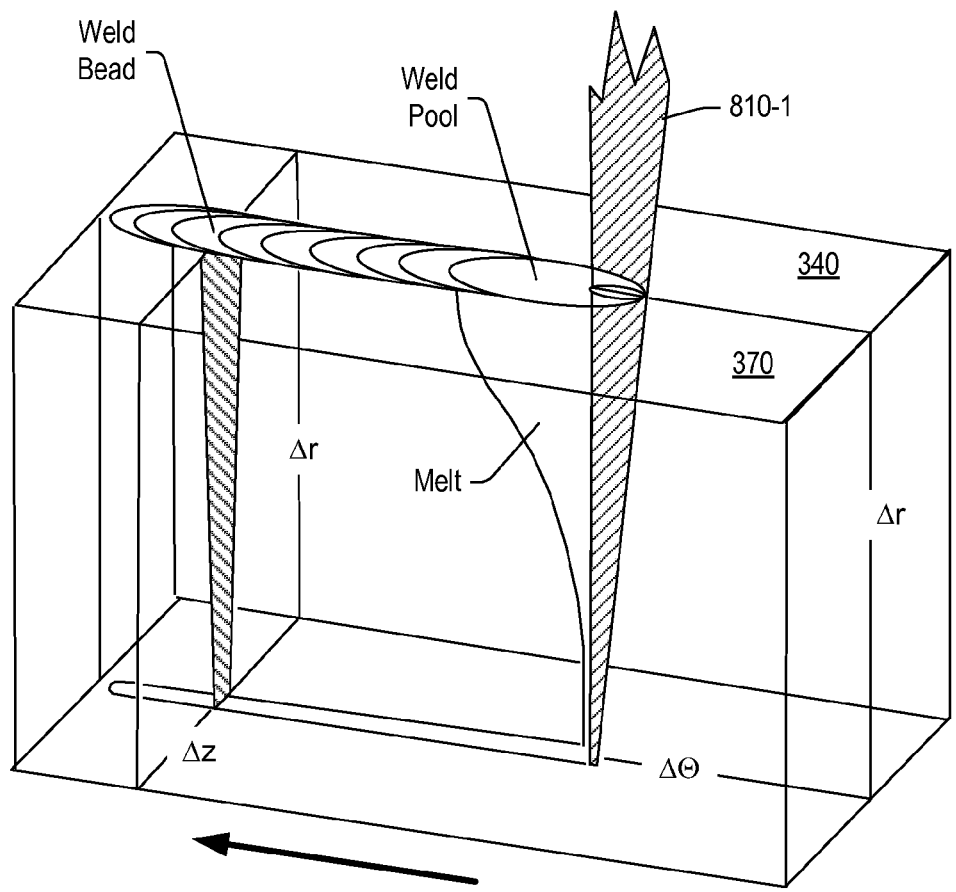

FIG. 16 shows an example of a method 1600 that may occur prior to, during and/or after a welding process (e.g., or welding processes). As shown, the method 1600 includes an acquisition block 1610 for acquiring information, an analysis block 1620 for analyzing at least a portion of the information, and an assessment block 1630 for assessing one or more processes based at least in part on the analyzing.

FIG. 16 also shows a diagram of components being welded where the components may be the hub end 340 of the turbine wheel 330 and the turbine wheel end 370 of the shaft 360. As shown, a laser beam 810-1 may form a melt with a weld pool visible at the surface of the components; noting that the components may be moving in a direction as indicated by an arrow while the laser beam 810-1 may be relatively stationary (e.g., via aiming of a beam spot). Ahead of the laser beam 810-1, a seam exists (e.g., a joint), as defined by the two components while, behind the laser beam 810-1, a weld bead is formed. As mentioned, a beam spot of a laser beam may be aimed at a seam or slightly off a seam (e.g., with a center more toward one component than another component). As indicated via cross-sectional views (see the plane with an axial dimension $\Delta z$ and the plane with an azimuthal dimension $\Delta \Theta$), the weld bead is a surface portion of the weld that extends downwardly from the surface. Information as to, for example, the shape, size, etc. of the weld bead may be analyzed to assess a welding process.

As an example, the acquisition block 1610 may include acquiring information via a laser-based sensor. For example, consider a laser-based sensor that triangulates a seam, a weld bead, etc. As an example, an analysis of information may output information as to roughness, concavity, radius percentage, etc. As an example, an analysis may output information as to a profile or profiles. For example, consider information as to a seam profile, a weld bead profile, a weld pool profile, etc. As an example, one or more process-related parameters may be adjusted, selected, etc. based at least in part on information from an analysis or analyses.

Figure 17:
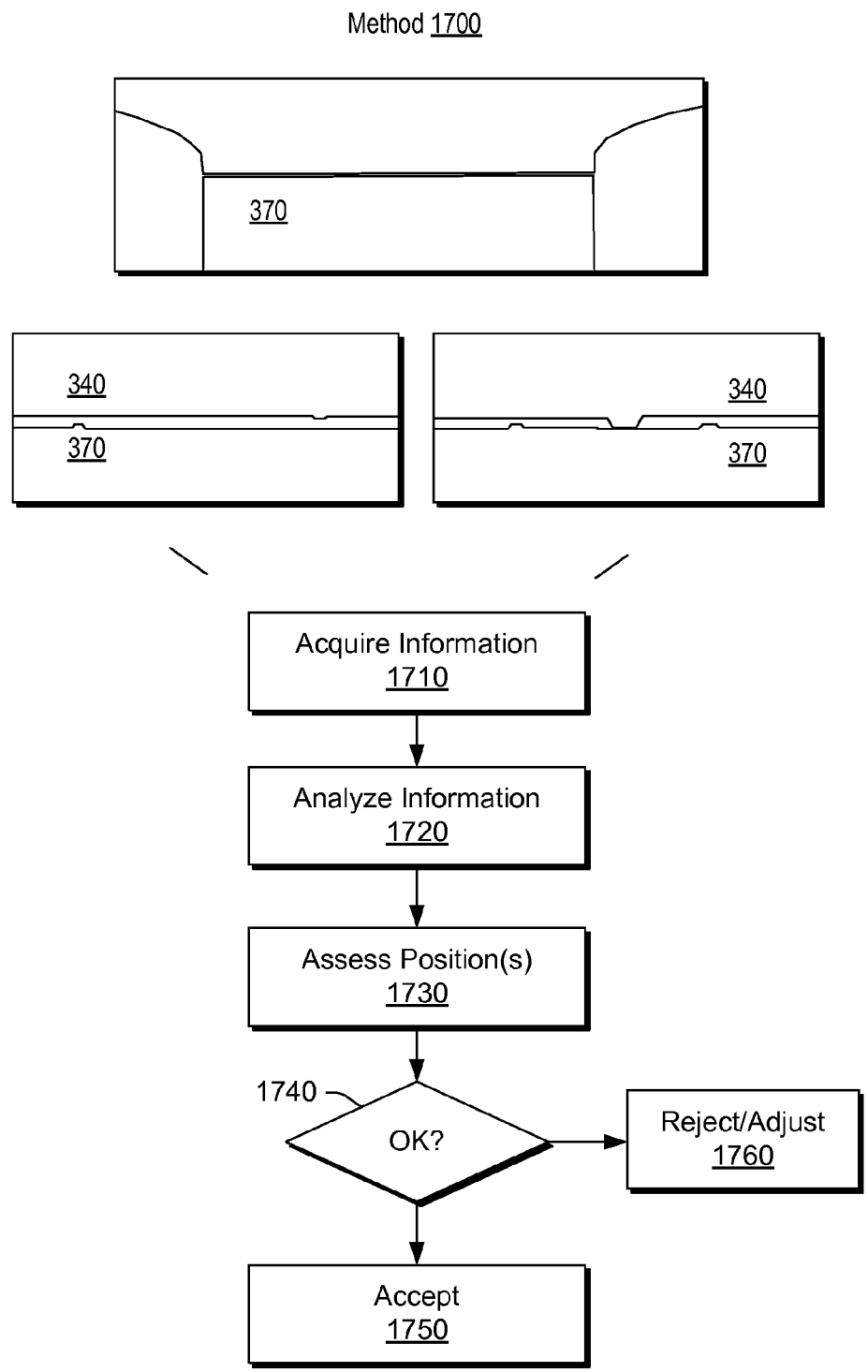
FIG. 17 is a diagram of an example of a method.

FIG. 17 shows an example of a method 1700 that may occur prior to and/or during a welding process (e.g., or welding processes). As shown, the method 1700 includes an acquisition block 1710 for acquiring information, an analysis block 1720 for analyzing at least a portion of the information, an assessment block 1730 to assess one or more positions (e.g., seam position, axial position, contact position, etc.), a decision block 1740 that decides whether the assessed position or positions are acceptable per an acceptance block 1750 or not acceptable per a rejection and/or adjustment block 1760.

As an example, the method 1700 may be applied to control one or more aspects of a welding process or welding processes. For example, the method 1700 may acquire images with respect to a joint formed by the hub end 340 of the turbine wheel 330 and the turbine wheel end 370 of the shaft 360. One or more of such images may be analyzed as to clearance, contact, alignment, etc. As an example, the method 1700 may include adjusting position, force, rotational speed, etc. of the hub end 340 and/or the turbine wheel shaft end 370.

As an example, a beam or beams may be adjusted based at least in part on image analysis. For example, beam energy, beam focal length, beam spot size, etc. may be adjusted based on image analysis (e.g., based on one or more of joint clearance, contact, alignment, etc.).

As an example, a method can include seam tracking. As an example, a method can include gap detection. As an example, a method can include detecting a seam position by finding a point on a component (e.g., a shaft or a turbine wheel) where the point may be a point that contacts another component (e.g., a turbine wheel or a shaft). As an example, a "set-up" may be accepted or rejected. As an example, a rejected "set-up" may be adjusted to reposition one or more components. For example, adjusting may include rotating one component while maintaining another component stationary. As another example, adjusting may include rotating two components to different extents (e.g., one clockwise and the other counter-clockwise).

As an example, a method can include locating a shaft plane prior to contacting the shaft with a turbine wheel. In such an example, the locating can include probing, for example, with a contact probe, a non-contact probe or a contact probe and a non-contact probe. As an example, a non-contact probe may be laser-based. As an example, a method can include comparing a probed position (e.g., as identified by probing) to a reference position (e.g., a position of a reference surface, etc.). As an example, probing may be part of a positioning method that positions components with respect to each other for purposes of welding via one or more laser beams, which may have relatively small spot size(s). As an example, probing may provide for position accuracy less than about 20 microns.

Figure 18:
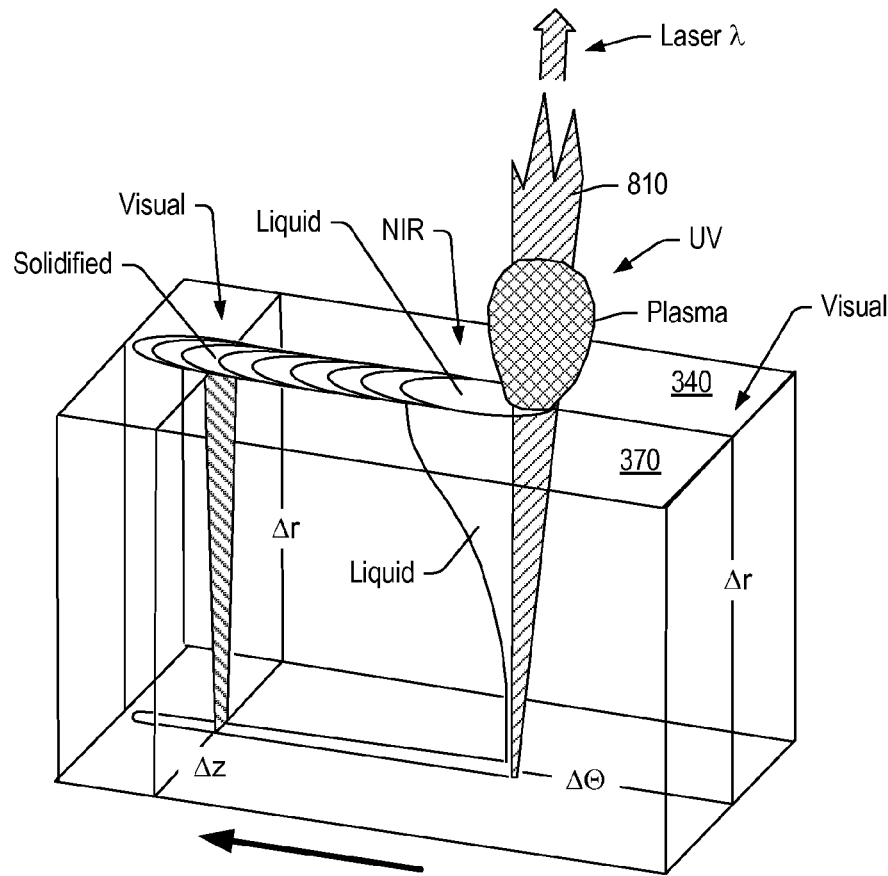
FIG. 18 is a table and a diagram of examples of sensors and sensor information.

FIG. 18 shows a table 1810 listing examples of sensors and sensor information and a diagram of a weld being formed by a laser 810 to weld a component 340 to a component 370. The table 1810 lists a plasma or metal plume sensor, a temperature sensor, a back reflection sensor and a visible light sensor. The table 1810 further lists examples of wavelengths of energy that may be sensed by one or more of the sensors. For example, the plasma or metal plume sensor may include circuitry to sense UV energy (e.g., less than about 600 nm), the temperature sensor may include circuitry to sense NIR energy (e.g., from about 1100 nm to about 1800 nm), the back reflection sensor may include circuitry to sense energy associated with a laser (e.g., consider a Yb:YAG laser, etc.), and the visible energy sensor may include circuitry to sense visible light energy (e.g., about 390 nm to about 700 nm). As shown in the table 1810, information from a plasma or metal plume sensor may pertain to laser power, focus position of a laser beam, gas protection, seam position, welding gap widening, etc.; information from a temperature sensor may pertain to changes in heat dissipation or conduction, for example, due to one or more weld faults (e.g., consider porosity, under penetration, etc.); information from a back reflection sensor may pertain to one or more keyhole characteristics (e.g., welding penetration depth, splatters, etc.); and information from a visible light sensor may pertain to a size, a shape, a surface, a seam, etc. (e.g., consider characteristics of post- and pre-weld regions).

As an example, a system may include one or more sensors that can sense information prior to welding, during welding and/or after welding. As an example, a system may sense information via one or more sensors and analyze at least a portion of the sensed information as to quality of a weld and/or one or more components (e.g., physical characteristics, position, etc.). As an example, a system may analyze information by determining one or more deviations from reference information. For example, a system may include a reference signal that can be compared to a sensed signal. As an example, a system may analyze sensed information in real-time, for example, to determine whether a weld defect has occurred. As an example, a system may acquire a signal and analyze at least a part of that signal versus a reference signal to determine whether a welding defect has occurred.

As an example, a system may include one or more interfaces for receiving information and one or more circuits for analyzing information. As an example, a system may include one or more processors that can perform calculations based at least in part on sensed information to determine whether a welding defect has occurred, optionally in real-time (e.g., or near real-time) with respect to receipt of the information.

As an example, a method can include welding, receiving information pertaining to a weld formed by the welding and analyzing at least a portion of the received information. In such an example, the method may determine, based on the analyzing, if the weld is defective. For example, the method may compare at least a portion of received information to other information to determine if a condition (e.g., a quality metric) has been violated. For example, if a weld pool is expected to be greater than a certain dimension and/or less than a certain dimension, deviation from one or more of those dimensions may cause a violation (e.g., indicate that a weld is defective).

Figure 19:
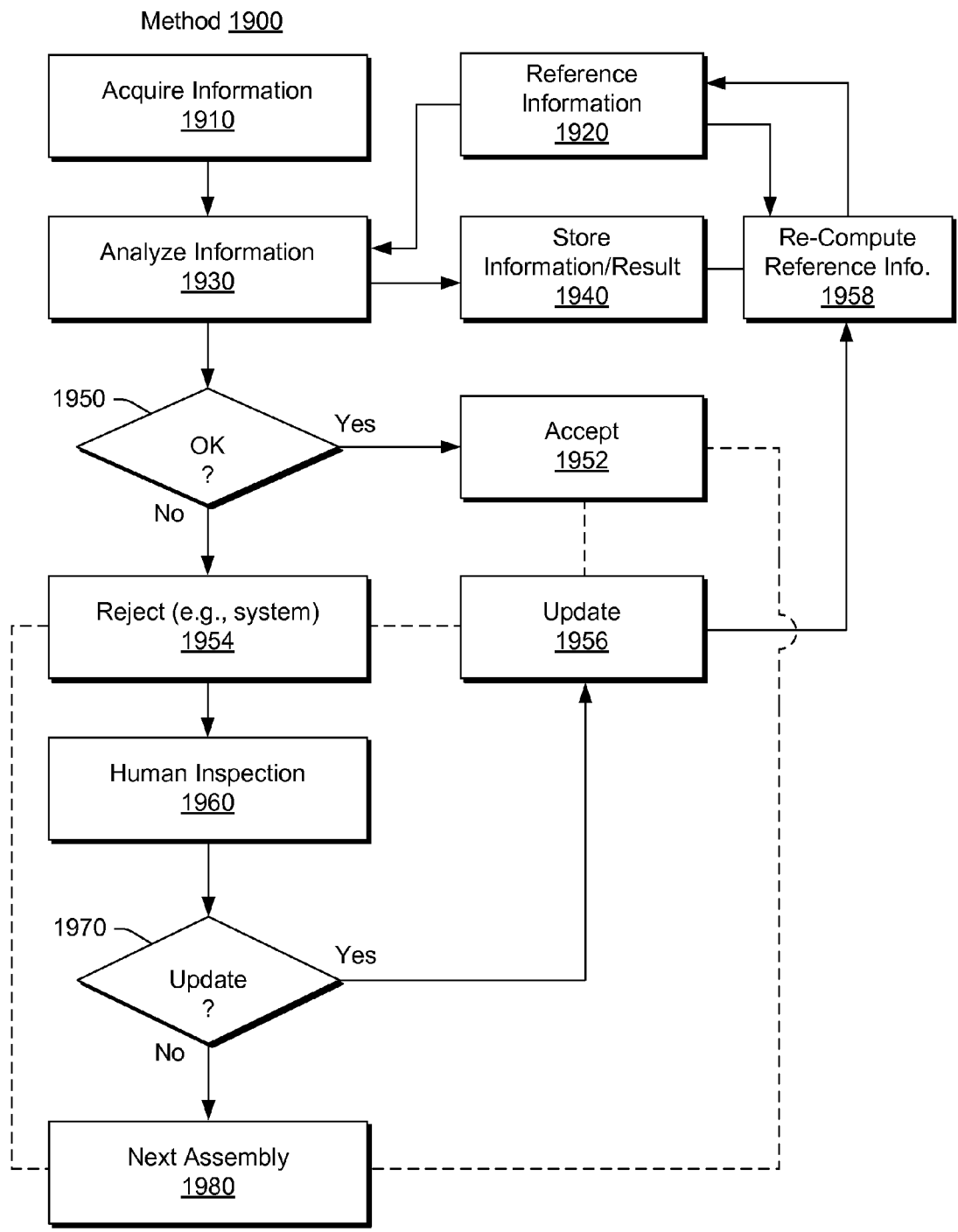
FIG. 19 is a diagram of an example of a method.

FIG. 19 shows a method 1900 that includes an acquisition block 1910 for acquiring information (e.g., sensed information, etc.) associated with a welding process, a reference information block 1920 for transmitting reference information, an analysis block 1930 for analyzing at least a portion of the acquired information with respect to at least a portion of the reference information, a storage block 1940 for storing information and/or a result or results of the analysis block 1930, a decision block 1950 for deciding whether a weld formed by the welding process is acceptable, an acceptance block 1952 for accepting a weld formed by the welding process (e.g., two components welded to form a unit, etc.), a rejection block 1954 for rejecting a weld formed by the welding process (e.g., rejecting a unit formed via two welded components), and an update block 1956 for triggering a re-compute block 1958 for re-computing reference information based at least in part on an acceptance per the acceptance block 1952 and/or a rejection per the rejection block 1954. As shown, the method 1900 may continue in a next assembly block 1980, for example, to acquire information per the acquisition block 1910 as to an assembly to be welded by a welding process.

As shown in FIG. 19, the re-compute block 1958 may update reference information of the reference information block 1920, optionally via receiving stored information and/or stored result(s) from the storage block 1940 and via receiving existing reference information from the reference information block 1920. For example, one or more statistical techniques may be applied to compute one or more metrics based at least in part on information received by the re-compute block 1958. Such one or more metrics may thereby be updated as part of a learning process, which may be a machine-based learning process.

The method 1900 may optionally include a human inspection block 1960, for example, for human and/or human guided machine inspection of a rejected unit formed by welding of two components via the welding process. The human inspection block 1960 may provide information sufficient to make a decision per a decision block 1970 for deciding whether to update information (e.g., reference information) per the update block 1956. As an example, the human inspection block 1960 may provide information as to a machine-based false negative (e.g., rejection) and/or a machine-based false positive (e.g., acceptance). Thus, while the human inspection block 1960 is shown as following the rejection block 1954, it may optionally occur after the acceptance block 1952. Information as to a rejection and/or an acceptance may optionally be used to update reference information where, for example, the one or more metrics may be for purposes of quality control, etc. of a welding process.

Figure 20:
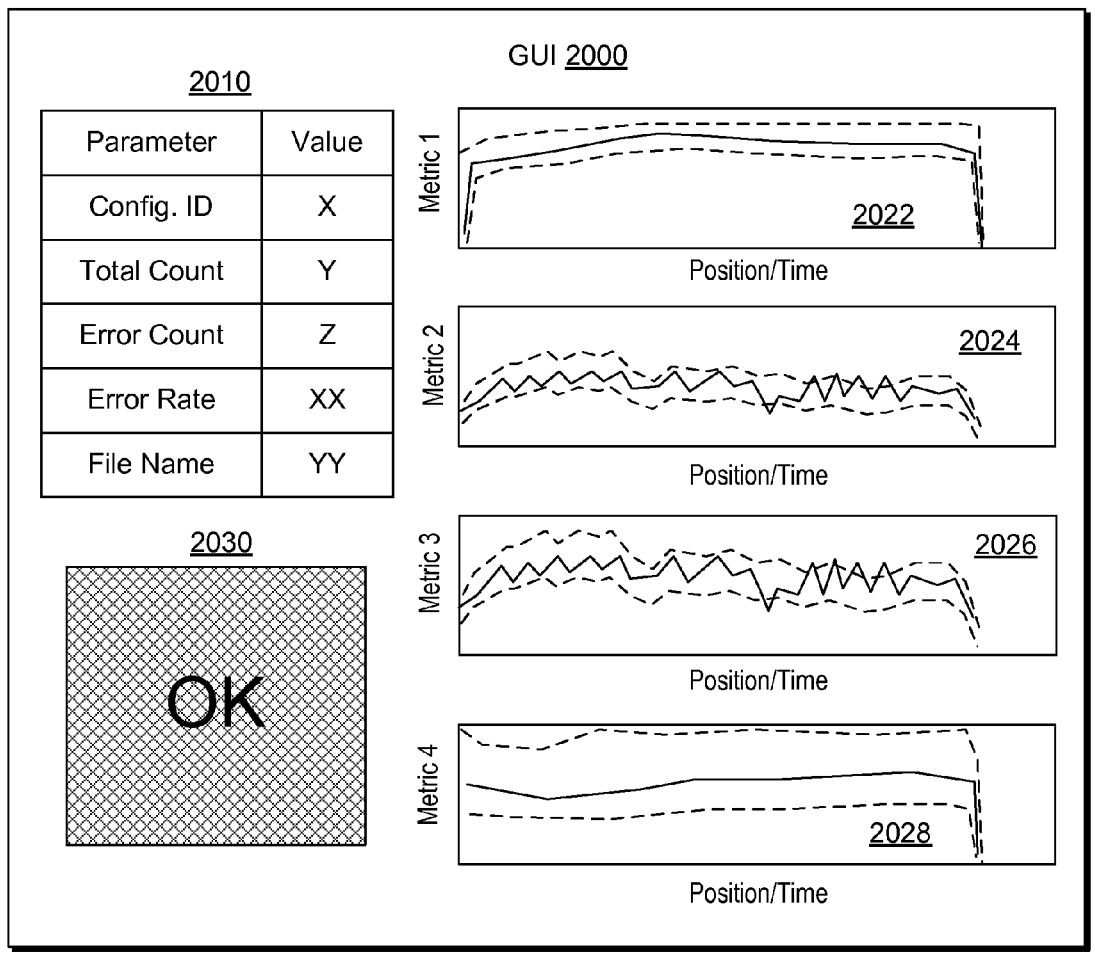
FIG. 20 is a diagram of an example of a graphical user interface (GUI) and examples of display devices and/or display systems.

FIG. 20 shows an example of a graphical user interface (GUI) 2000 and examples of display devices and/or display systems 2050. Such a GUI may be rendered to one or more displays, for example, via execution of instructions by a processor (e.g., a controller, a CPU, a GPU, etc.).

In the example of FIG. 20, the GUI 2000 includes a graphic 2010 with fields that list parameters and associated values, graphics 2022, 2024, 2026 and 2028 that show values of metrics versus position and/or time, and an indicator graphic 2030 that may indicate a status of a weld, an assembly, a component of an assembly, a unit, etc. For example, the graphic 2030 may indicate OK, ACCEPT, PASS, etc. via text and/or color (e.g., consider yellow) and/or may indicate NOK, REJECT, NOT PASS, etc. via text and/or color (e.g., consider red). As an example, where operator attention is called for by a system, the graphic 2030 may provide for a suitable indication, whether text and/or color.

As an example, the graphics 2022, 2024, 2026 and 2028 may be for one or more welding beams. For example, the graphics 2022 and 2024 may be for one laser beam that forms a weld to weld two components and the graphics 2026 and 2028 may be for another laser beam that forms a weld to weld the two components. Thus, the GUI 2000 may display information as to one or more welds being formed, which may optionally be formed simultaneously. As an example, formation of a plurality of welds by individual laser beams may be commenced and/or may be terminated in time substantially simultaneously. As an example, formation of a plurality of welds by individual laser beams may be commenced and/or may be terminated in time asynchronously.

Figure 21:
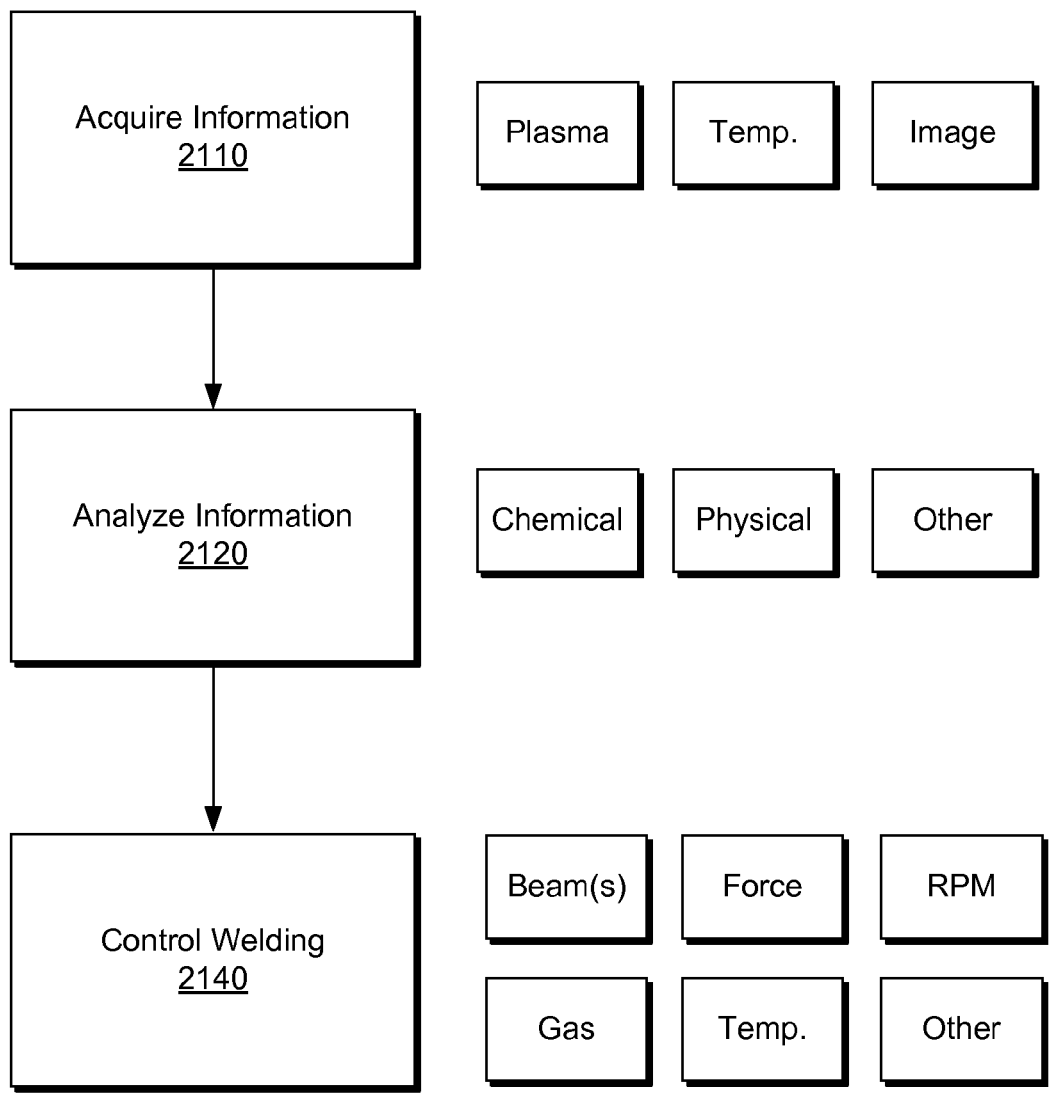
FIG. 21 is a diagram of an example of a method.

FIG. 21 shows an example of a method 2100 that includes an acquisition block 2110 for acquiring information, an analysis block 2120 for analyzing information and a control block 2140 for controlling one or more aspects of welding. In the example of FIG. 21, the acquisition block 2110 may acquire information such as, for example, plasma information, temperature information, image information, etc. As an example, the analysis block 2120 may include analyzing information as to chemical character, physical character and/or one or more other characters. As an example, the control block 2140 may include controlling one or more beams, force, RPM, gas, temperature and/or one or more other aspects of welding.

Figure 22:
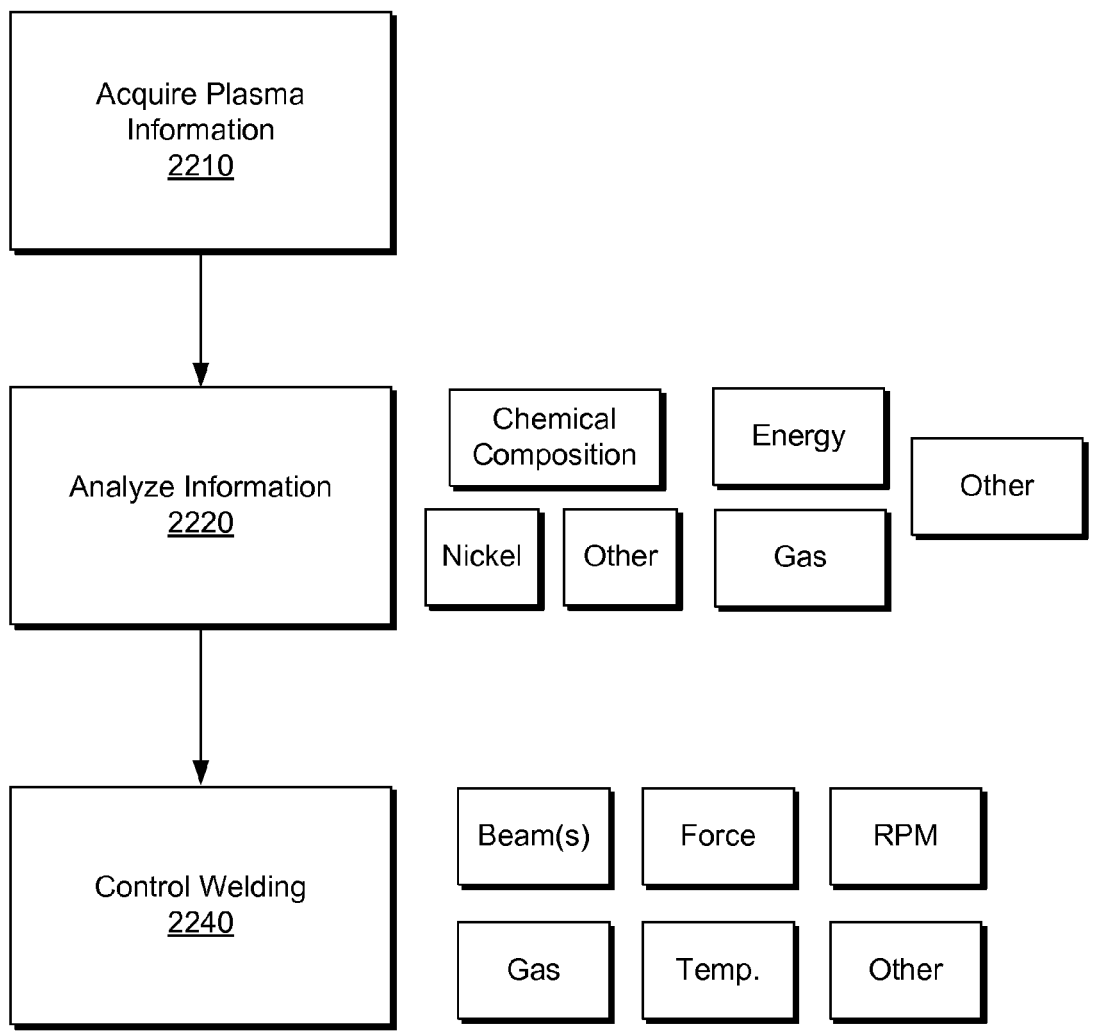
FIG. 22 is a diagram of an example of a method.

FIG. 22 shows an example of a method 2200 that includes an acquisition block 2210 for acquiring plasma information, an analysis block 2220 for analyzing at least a portion of the plasma information and a control block 2240 for controlling one or more aspects of welding. As an example, plasma information may be analyzed with respect to chemical composition (e.g., nickel and/or other constituents). As an example, plasma information may be analyzed with respect to energy (e.g., absorbed energy, transmitted energy, reflected energy, etc.). As an example, plasma information may be analyzed with respect to gas (e.g., a generated gas, a supplied gas, an ambient gas, etc.).

As an example, a method can include co-axially locating a turbine wheel and a shaft where a force applicator applies an axially directed force to the turbine wheel, where the turbine wheel transfers at least a portion of the force to shaft and where a rotatable shaft collet supports the shaft; rotating the rotatable shaft collet; energizing at least one laser beam; and via the at least one laser beam, forming a weld between the turbine wheel and the shaft. In such an example, the method may include locating the turbine wheel via a turbine wheel collet. As an example, a turbine wheel collet may be a spring collet that can apply a biasing force against a portion of a turbine wheel (e.g., an outer edge of a hub portion, etc.). As an example, a collet may be a nose collet that may be, for example, a spring collet that can apply a biasing force against a portion of a turbine wheel (e.g., a nose portion, etc.). As an example, a collet may operate to apply an axial force to a turbine wheel. As an example, a collet may operate to receive an axial force from a turbine wheel. As an example, a turbine wheel collet may be a rotatable turbine wheel collet. As an example, a nose collet may be a rotatable nose collet.

As an example, a method can include, during forming of one or more welds, adjusting an axially directed force applied to the turbine wheel. In such an example, the force can be less than approximately 100 N and, for example, less than approximately 30 N.

As an example, a method can include aiming at least one laser beam at a joint between a turbine wheel and a shaft. In such an example, aiming can aim the at least one laser beam to a greater percentage at the turbine wheel. As an example, such a method can include forming a weld where the weld includes a higher percentage of material of the turbine wheel than material of the shaft.

As an example, a method can include applying a compliance force that compensates for material loss in an axial direction as associated with forming a weld (e.g., or forming welds).

As an example, a method can include forming a contact between a turbine wheel and a shaft that exists at single mating region. As an example, a shaft can include a piloting spigot and a turbine wheel can include a piloting bore. As an example, a turbine wheel can include a stepped recess and a shaft can be pilotless.

As an example, a method can include analyzing quality of a weld by reflecting energy off a turbine wheel and a shaft and analyzing the energy. In such an example, the method can include controlling at least one parameter responsive to the analyzing of the energy. For example, the energy that can be analyzed may include at least one of visible light energy, ultraviolet energy, infrared energy and near infrared energy.

As an example, a method can include forming a plasma. In such an example, the method may include acquiring information from the plasma and analyzing the information as to a chemical characteristic. For example, consider a shielding gas characteristic. As an example, a method can include controlling at least one parameter responsive to analyzing of information as to a chemical characteristic. As an example, a method can include acquiring information from a plasma and analyzing the information as to a physical characteristic of the plasma. As an example, a method may include forming two plasmas. In such an example, the method may include acquiring information from the two plasmas and analyzing the information. Such a method may also include controlling at least one parameter responsive to the analyzing of the information (e.g., a welding related parameter, etc.). As an example, a method can include comparing at least one characteristic of a plasma to at least one characteristic of another of plasma. In such an example, a method can include controlling at least one parameter responsive to the comparing.

As an example, a method can include sensing information about a weld formed between a turbine wheel and a shaft. For example, a method can include analyzing at least a portion of the information to determine quality of the weld. Such a method may include, based at least in part on the quality of the weld, accepting the weld or rejecting the weld.

As an example, a method can include receiving information sensed by a plasma or metal plume sensor and determining at least one member selected from a group consisting of laser beam power, laser beam focus position, gas protection, seam position of a seam formed by two components and welding gap widening.

As an example, a method can include receiving information sensed by a temperature sensor and determining at least one member selected from a group consisting of a change in heat dissipation and a change in heat conduction (e.g., during a welding process, welding processes, etc.). In such an example, the method may include associating a determined change in heat dissipation or a determined change in heat conduction with a faulty weld. As an example, a fault of a faulty weld may be or include a porosity-based fault and/or a penetration-based fault.

As an example, a method can include receiving information sensed by a back reflection sensor and determining at least one characteristic of a keyhole formed at least in part by energy of one of the at least one laser beam.

As an example, a method can include co-axially locating a turbine wheel and a shaft where a force applicator applies an axially directed force to the turbine wheel, where the turbine wheel transfers at least a portion of the force to shaft and where a rotatable shaft collet supports the shaft; rotating the rotatable shaft collet; acquiring information associated with a joint formed between the turbine wheel and the shaft; analyzing at least a portion of the information; and based at least in part on the analyzing, adjusting at least one parameter associated with a welding process to weld the turbine wheel and the shaft. In such an example, the method may include probing with a contact probe or a non-contact probe (e.g., as to determining one or more positions of a component or components).

As an example, a method can include analyzing a joint with respect to points of contact between a turbine wheel and a shaft. For example, consider analyzing the joint with respect to gaps between the turbine wheel and the shaft. In such an example, an image acquisition system may capture one or more images that may be analyzed, for example, to determine if one or more gaps prevent acceptable seating of a turbine wheel with respect to a shaft. In such an example, where a seating issue exists, a method can include reloading a turbine wheel, etc.

As an example, a method can include analyzing a joint (e.g., a seam) with respect to one or more points of contact, one or more gaps or one or more points of contact and one or more gaps between a turbine wheel and a shaft.

As an example, a method can include performing a welding process, for example, at least in part via energizing at least one beam (e.g., a laser beam, etc.) or, for example, energizing a plurality of laser beams.

As an example, a system can include a controller; a force applicator; a rotatable shaft centering collet; a drive mechanism that rotates the rotatable shaft centering collect; and a laser beam unit. In such an example, the system can include a rotatable turbine wheel centering collet and, for example, a drive mechanism that rotates the rotatable turbine wheel centering collet.

As an example, a system may provide for formation of a line-of-sight gap between a rotatable turbine wheel centering collet and a rotatable shaft centering collet.

As an example, a system can include a camera directed via optics. For example, consider a camera that senses energy of wavelengths in the visible light portion of the electromagnetic energy spectrum.

As an example, a system can include a beam splitter that splits a laser beam of a laser beam unit. For example, a beam splitter may split a laser beam into two beams. As an example, a system can include optics that direct spots of two beams (e.g., as optionally split from a common beam) at a joint formed by a turbine wheel and a shaft centered by a rotatable shaft centering collet.

As an example, a system can include a force applicator that includes a force applicator axis and a rotatable shaft centering collet that includes a shaft collet axis. In such an example, the system may align the axes co-axially and, for example, with respect to gravity. As an example, a weld pool or weld pools formed may be subject to acceleration of gravity. Alignment with gravity of component axes may provide for a more even (e.g., uniform) weld or welds.

As an example, a system can include a controller that includes circuitry (e.g., hardware, hardware and software, etc.) that can control force applied by a force applicator, rotation of a rotatable shaft centering collet by a drive mechanism, and emission energy of a laser beam unit.

As an example, a system can include at least one sensor. In such an example, a controller can include an input for receipt of information sensed by the at least one sensor. As an example, a controller of a system can analyzes information to determine quality of at least one weld.

As an example, a system can include a plasma or metal plume sensor where a controller of the system can receive information sensed by the plasma or metal plume sensor to determine at least one member selected from a group consisting of laser beam power, laser beam focus position, gas protection, seam position of a seam formed by two components and welding gap widening.

As an example, a system can include a temperature sensor where a controller of the system can receive information sensed by the temperature sensor to determine at least one member selected from a group consisting of a change in heat dissipation and a change in heat conduction. In such an example, the controller may associate a determined change in heat dissipation or a determined change in heat conduction with a faulty weld (e.g., consider a porosity-based fault, a penetration-based fault, etc.). As an example, a controller can receive information sensed by one or more temperature sensors (e.g., optionally with respect to angle and optionally during rotation of a component or components) to determine at least one member selected from a group consisting of a change in heat dissipation and a change in heat conduction where, for example, the controller may associate a determined change or changes with a faulty weld. In such an example, the controller may identify a faulty weld as a portion of a weld or as portions of a weld (e.g., via one or more angle positions, etc.).

As an example, a system can include a back reflection sensor where a controller of the system can receive information sensed by the back reflection sensor to determine at least one characteristic of a keyhole formed at least in part by energy of a laser beam unit (e.g., via one or more laser beams).

As an example, a system can include a display and controller executable instructions to render a graphical user interface (GUI) to the display. In such an example, the GUI can include a quality control graphic that indicates acceptance of a welded unit or rejection of a welded unit.

As an example, a system can include a controller that can control, based at least in part on input to the controller (e.g., via one or more information interfaces), a laser beam unit, a force applicator or a drive mechanism. In such an example, the controller may control one or more optical elements that may provide for splitting a laser beam, aiming a laser beam or laser beams, etc.

As an example, a system can include a controller that can control at least one parameter of a welding process based at least in part on at least one characteristic of a plasma generated by a laser beam as sensed by one or more sensors. As an example, a system can include a controller that can control at least one parameter of welding processes based at least in part on at least one characteristic of plasmas generated by laser beams as sensed by one or more sensors. In such an example, the controller can include control circuitry that can compare a characteristic of one of the plasmas to a characteristic of another one of the plasmas. In such an example, information from one or more sensors may be analyzed to determine a characteristic, characteristics, etc.

As an example, a system can include a turbine wheel clamp. As an example, a system can include a controller that can control force applied by a force applicator. For example, the controller may control force applied by the force applicator to a turbine wheel and/or to a shaft during a welding process. As an example, a force may be applied by a turbine wheel clamp and/or received by a turbine wheel clamp. As an example, a turbine wheel clamp may be configured as a nose collet, a hub collet, etc. As an example, a clamp may be a rotatable clamp.

As an example, a system can include one or more position probes. As an example, a position probe may be a non-contact probe. As an example, a position probe may be a contact probe. As an example, a position probe may determine a position of a portion of a shaft centered by a rotatable shaft centering collet. As an example, a controller of a system may control a characteristic of a seam formed by a turbine wheel and a shaft based at least in part on a position determined by a position probe. In such an example, the characteristic of the seam may be controlled with respect to a spot size of a laser beam of a laser beam unit.

As an example, a system can include a sensor unit that can sense at least one of plasma UV emissions, reflected laser beam emissions and near-infrared emissions. As an example, a system can include sensors that can sense, respectively, plasma UV emissions, reflected laser beam emissions and near-infrared emissions.

As an example, a system can include a gas nozzle. In such an example, the system can include a controller that can control delivery of gas via the gas nozzle. In such an example, the system can include a gas flow meter that senses flow of gas to the gas nozzle. As an example, a gas nozzle may direct gas toward a seam, a weld, a plasma, etc.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A system comprising:
   a controller;
   an axial force applicator assembly that comprises a rotatable turbine wheel nose collet and an axial force applicator axially aligned with gravity;
   a rotatable turbine wheel centering collet;
   a drive mechanism that rotates the rotatable turbine wheel centering collet;
   a rotatable shaft centering collet;
   a drive mechanism that rotates the rotatable shaft centering collet in unison with rotation of the rotatable turbine wheel centering collet; and
   a laser beam unit, wherein the controller controls force applied by the axial force applicator directly to a turbine wheel nose of a turbine wheel centered by the rotatable turbine wheel centering collet for welding, via the laser beam unit, a turbine wheel hub end of the turbine wheel to a shaft centered by the rotatable shaft centering collet wherein the rotatable turbine wheel nose collet rotates, via the turbine wheel, responsive to rotation of the rotatable turbine wheel centering collet by the drive mechanism that rotates the rotatable turbine wheel centering collet.

2. The system of claim 1 comprising a line-of-sight gap between the rotatable turbine wheel centering collet and the rotatable shaft centering collet.

3. The system of claim 1 comprising a camera directed via optics wherein the camera senses energy of wavelengths in a visible light portion of the electromagnetic energy spectrum.

4. The system of claim 1 comprising a beam splitter that splits a laser beam of the laser beam unit wherein the beam splitter splits the laser beam into two beams and comprising optics that direct spots of the two beams at a joint formed by a turbine wheel and a shaft centered by the rotatable shaft centering collet.

5. The system of claim 1 wherein the axial force applicator comprises a force applicator axis, the rotatable shaft centering collet comprises a shaft collet axis and wherein the axes are co-axially aligned with respect to gravity.

6. The system of claim 1 wherein the controller controls force applied by the axial force applicator, rotation of the rotatable shaft centering collet by the drive mechanism that rotates the rotatable turbine wheel centering collet, and emission energy of the laser beam unit.

7. The system of claim 1 comprising at least one sensor wherein the controller comprises an input for receipt of information sensed by the at least one sensor and wherein the controller analyzes information to determine quality of at least one weld.

8. The system of claim 1 comprising a plasma or metal plume sensor wherein the controller receives information sensed by the plasma or metal plume sensor to determine at least one member selected from a group consisting of laser beam power, laser beam focus position, gas protection, seam position of a seam formed by two components and welding gap widening.

9. The system of claim 1 comprising a temperature sensor wherein the controller receives information sensed by the temperature sensor to determine at least one member selected from a group consisting of a change in heat dissipation and a change in heat conduction and wherein the controller associates a determined change or changes with a faulty weld.

10. The system of claim 1 comprising a back reflection sensor wherein the controller receives information sensed by the back reflection sensor to determine at least one characteristic of a keyhole formed at least in part by energy of the laser beam unit.

11. The system of claim 1 comprising a display and controller executable instructions to render a graphical user interface (GUI) to the display wherein the GUI comprises a quality control graphic that indicates acceptance of a welded unit or rejection of a welded unit.

12. The system of claim 1 wherein the controller controls, based at least in part on input from one or more sensors, the laser beam unit, the axial force applicator or at least one of the drive mechanisms.

13. The system of claim 1 wherein the controller controls force applied by the axial force applicator during a welding process.

14. The system of claim 1 wherein the controller controls a characteristic of a seam formed by a turbine wheel and a shaft based at least in part on a position determined by a position probe wherein the characteristic of the seam is controlled with respect to a spot size of a laser beam of the laser beam unit.

15. The system of claim 1 comprising a sensor unit that senses at least one of plasma UV emissions, reflected laser beam emissions and near-infrared emissions.

16. The system of claim 1 comprising a gas nozzle wherein the controller controls delivery of gas via the gas nozzle.

17. A system comprising:
a controller;
a freely rotatable turbine wheel nose collet;
a force applicator oriented along an axis of the freely rotatable turbine wheel nose collet;
a rotatable turbine wheel centering collet;
a drive mechanism that rotates the rotatable turbine wheel centering collet;
a rotatable shaft centering collet;
a drive mechanism that rotates the rotatable shaft centering collet in unison with rotation of the rotatable turbine wheel centering collet; and
a laser beam unit,
wherein the force applicator comprises a force applicator axis, the rotatable turbine wheel centering collet comprises a turbine wheel collet axis, the rotatable shaft centering collet comprises a shaft collet axis and wherein the axes are co-axially aligned with respect to gravity.

* * * * *